US009102053B2

(12) United States Patent
Suzuki

(10) Patent No.: US 9,102,053 B2
(45) Date of Patent: Aug. 11, 2015

(54) INFORMATION PROCESSING APPARATUS AND INFORMATION PROCESSING METHOD

(71) Applicant: CANON KABUSHIKI KAISHA, Tokyo (JP)

(72) Inventor: Masahiro Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 6 days.

(21) Appl. No.: 13/784,684

(22) Filed: Mar. 4, 2013

(65) Prior Publication Data
US 2013/0238125 A1 Sep. 12, 2013

(30) Foreign Application Priority Data
Mar. 9, 2012 (JP) .................................. 2012-053685

(51) Int. Cl.
*B25J 9/00* (2006.01)
*B25J 9/16* (2006.01)

(52) U.S. Cl.
CPC .............. *B25J 9/1612* (2013.01); *B25J 9/1697* (2013.01); *G05B 2219/39508* (2013.01); *G05B 2219/40053* (2013.01)

(58) Field of Classification Search
CPC ................. B25J 9/1612; B25J 9/1697; G05B 2219/39508
USPC ............... 700/245, 253, 258, 259; 318/568.1, 318/568.11, 568.12, 568.16, 568.21; 901/2, 901/14, 31, 46
See application file for complete search history.

(56) References Cited

U.S. PATENT DOCUMENTS

| 4,402,053 A | 8/1983 | Kelley et al. |
| 4,412,293 A | 10/1983 | Kelley et al. |
| 4,639,878 A | 1/1987 | Day et al. |
| 4,680,802 A | 7/1987 | Nishida et al. |
| 4,831,549 A | 5/1989 | Red et al. |
| 4,942,539 A | 7/1990 | McGee et al. |

(Continued)

FOREIGN PATENT DOCUMENTS

| JP | 4226623 B2 | 2/2009 |
| JP | 2011-27623 A | 2/2011 |

OTHER PUBLICATIONS

K.S. Arun, et al., "Least-Squares Fitting of Two 3-D Point Sets", IEEE Pattern Analysis and Machine Intelligence, vol. 9, No. 5, 1987.

(Continued)

*Primary Examiner* — Dalena Tran
(74) *Attorney, Agent, or Firm* — Fitzpatrick, Cella, Harper & Scinto

(57) ABSTRACT

The state of an area where one or more target objects are arranged is determined based on the result of measurement by a first sensor. A robot is controlled to grip one of the target objects by the grip unit of the robot. The gripping state of the gripping target object gripped by the grip unit is determined from the result of measuring the gripping target object by using a second sensor. When it is determined that gripping has failed, a rearrangement area where the gripping target object is to be rearranged is decided using the result of measurement by the first sensor or that of measurement by the second sensor. The robot is controlled to rearrange the gripping target object in the rearrangement area by the grip unit.

36 Claims, 13 Drawing Sheets

(56) References Cited

U.S. PATENT DOCUMENTS

| | | | |
|---|---|---|---|
| 4,985,846 A | 1/1991 | Fallon | |
| 5,127,029 A | 6/1992 | Suzuki et al. | |
| 5,499,306 A | 3/1996 | Sasaki et al. | |
| 5,501,498 A | 3/1996 | Ulrich | |
| 5,513,299 A * | 4/1996 | Terasaki et al. | 700/255 |
| 5,943,476 A | 8/1999 | Dougherty et al. | |
| 6,101,455 A | 8/2000 | Davis | |
| 6,414,711 B2 | 7/2002 | Arimatsu et al. | |
| 6,658,962 B1 | 12/2003 | Rosheim | |
| 6,730,926 B2 | 5/2004 | Boillot et al. | |
| 6,757,422 B1 | 6/2004 | Suzuki et al. | |
| 6,856,341 B2 | 2/2005 | Suzuki | |
| 6,927,955 B2 | 8/2005 | Suzui et al. | |
| 7,084,900 B1 | 8/2006 | Watanabe et al. | |
| 7,171,041 B2 | 1/2007 | Watanabe et al. | |
| 7,177,459 B1 * | 2/2007 | Watanabe et al. | 382/151 |
| 7,313,464 B1 * | 12/2007 | Perreault et al. | 700/245 |
| 7,589,747 B2 | 9/2009 | Matsui et al. | |
| 7,728,852 B2 | 6/2010 | Suzuki et al. | |
| 7,868,904 B2 | 1/2011 | Morita et al. | |
| 7,957,583 B2 | 6/2011 | Boca et al. | |
| 7,965,904 B2 | 6/2011 | Kobayashi | |
| 7,966,094 B2 | 6/2011 | Ban et al. | |
| 7,996,114 B2 * | 8/2011 | Ban et al. | 700/259 |
| 8,265,403 B2 | 9/2012 | Abe et al. | |
| 8,295,975 B2 | 10/2012 | Arimatsu et al. | |
| 8,416,722 B2 | 4/2013 | Suzuki | |
| 8,437,535 B2 * | 5/2013 | Boca et al. | 382/154 |
| 2004/0103740 A1 | 6/2004 | Townsend et al. | |
| 2005/0234981 A1 * | 10/2005 | Manousos et al. | 707/103 Y |
| 2009/0310583 A1 | 12/2009 | Suzuki | |
| 2010/0004778 A1 | 1/2010 | Arimatsu et al. | |
| 2011/0164114 A1 | 7/2011 | Kobayashi et al. | |
| 2011/0222995 A1 * | 9/2011 | Irie et al. | 414/225.01 |
| 2012/0121135 A1 | 5/2012 | Kotake et al. | |
| 2013/0006423 A1 | 1/2013 | Ito et al. | |
| 2013/0151007 A1 | 6/2013 | Valpola et al. | |
| 2013/0184870 A1 | 7/2013 | Ota et al. | |
| 2013/0238128 A1 | 9/2013 | Suzuki | |

OTHER PUBLICATIONS

U.S. Appl. No. 13/781,644, filed Feb. 28, 2013. Applicant: Masahiro Suzuki.

U.S. Appl. No. 13/775,888, filed Feb. 25, 2013. Applicant: Masahiro Suzuki.

U.S. Appl. No. 13/865,917, filed Apr. 18, 2013. Applicants: Yasuo Katano, et al.

U.S. Appl. No. 13/781,644, filed Feb. 28, 2013. Applicants: Masahiro Suzuki, et al.

U.S. Appl. No. 13/829,362, filed Mar. 14, 2013. Applicant: Motoharu Suzuki.

* cited by examiner

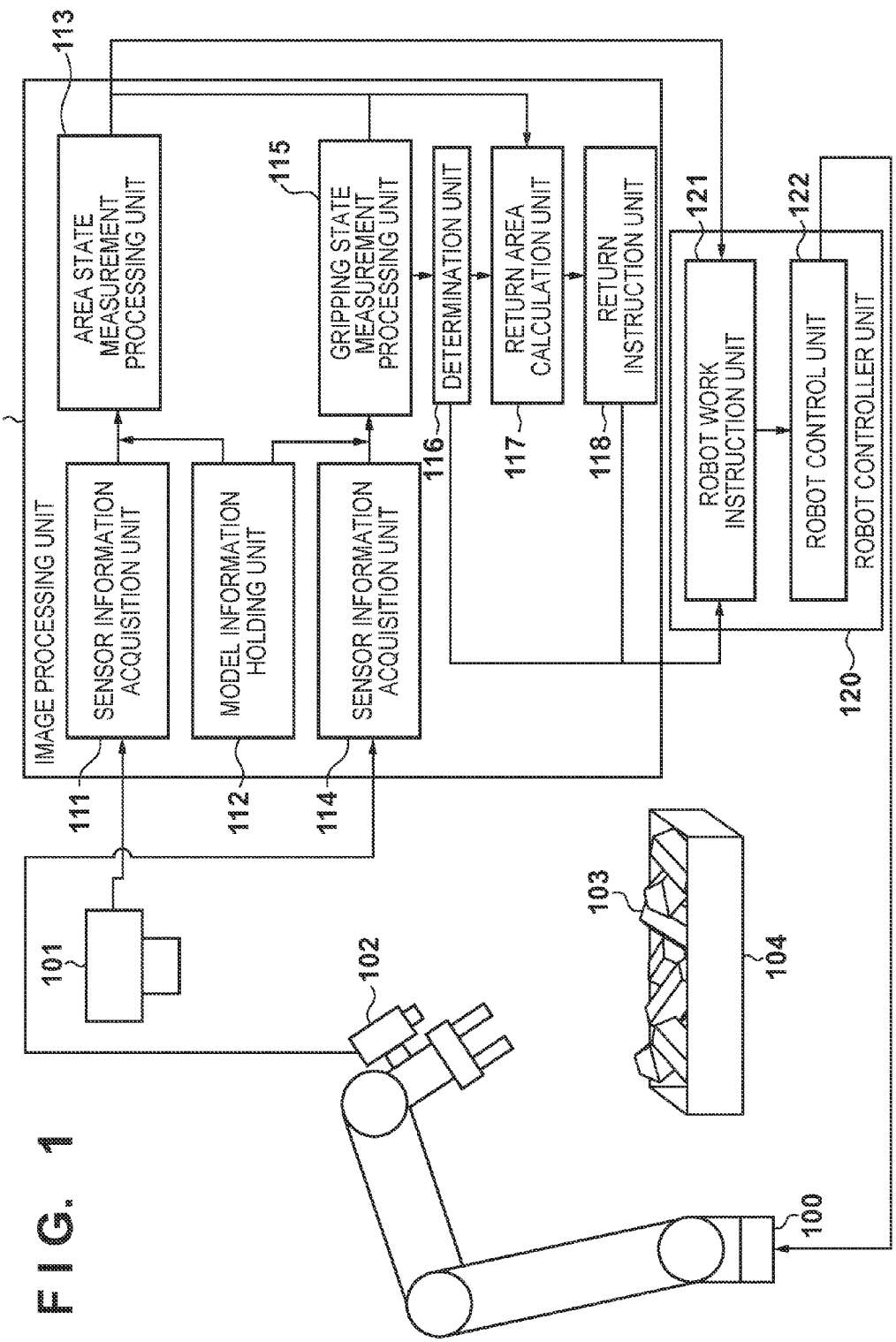

FIG. 2D

| POINT | x | y | z |
|---|---|---|---|
| P1 | 0 | 0 | 0 |
| P2 | 20 | 140 | 0 |
| P3 | 80 | 140 | 0 |
| P4 | 100 | 0 | 0 |
| P5 | 0 | 0 | 600 |
| P6 | 20 | 140 | 600 |
| P7 | 80 | 140 | 600 |
| P8 | 100 | 0 | 600 |

FIG. 2E

| LINE | TWO ENDS |
|---|---|
| L1 | P1, P2 |
| L2 | P2, P3 |
| L3 | P3, P4 |
| L4 | P1, P4 |
| L5 | P2, P6 |
| L6 | P3, P7 |
| L7 | P4, P8 |
| L8 | P1, P5 |
| L9 | P5, P6 |
| L10 | P6, P7 |
| L11 | P7, P8 |
| L12 | P5, P8 |

FIG. 2F

| SURFACE | SURROUNDING LINES | NORMAL (x,y,z) |
|---|---|---|
| S1 | L1, L2, L3, L4 | (0, 0, -1) |
| S2 | L1, L5, L8, L9 | (-0.88, 0.12, 0) |
| S3 | L2, L5, L6, L10 | (0, 1, 0) |
| S4 | L3, L6, L7, L11 | (0.88, 0.12, 0) |
| S5 | L4, L7, L8, L12 | (0, -1, 0) |
| S6 | L9, L10, L11, L12 | (0, 0, 1) |

F I G. 3
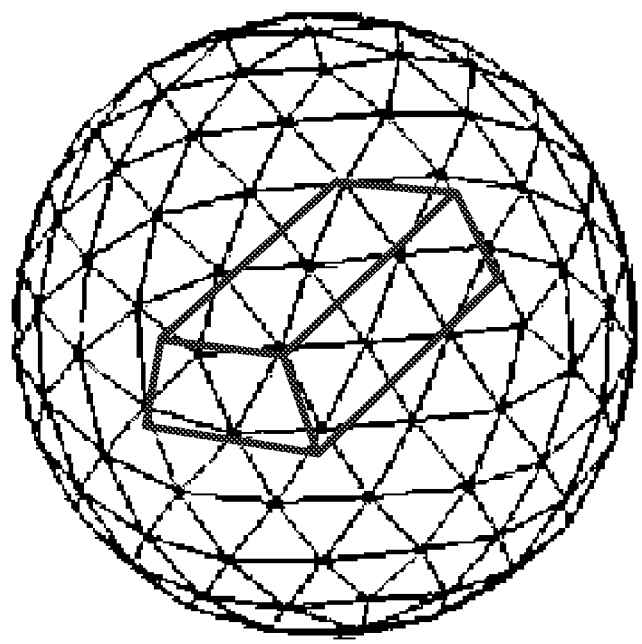

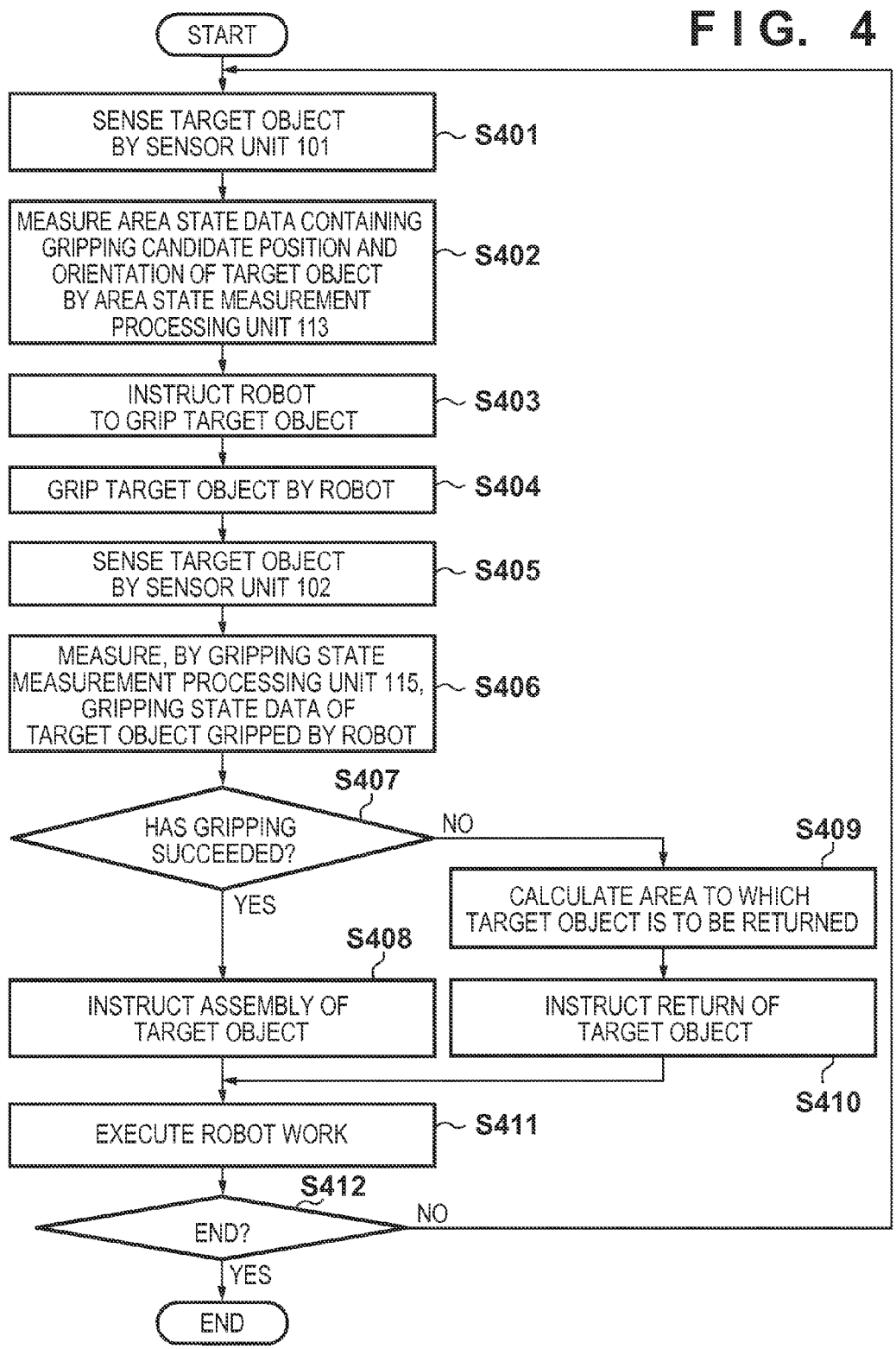

INFORMATION PROCESSING APPARATUS AND INFORMATION PROCESSING METHOD

BACKGROUND OF THE INVENTION

1. Field of the Invention

The present invention relates to a technique of obtaining the position and orientation of a target object.

2. Description of the Related Art

Along with recent development of robot technologies, robots are replacing humans to do complex tasks such as assembly of industrial products, which have been done by humans. A robot picks parts using an end effector such as a hand, and assembles them. Conventionally, parts to be picked are supplied using an apparatus called a parts feeder for supplying parts one by one in line, or supplied by heaping parts in various orientations in a pallet (box). When the parts feeder is used, each part is supplied in a predetermined position and orientation, and the robot relatively easily picks it. However, it additionally costs to prepare the parts feeder. In some cases, different parts feeders need to be prepared in accordance with the shapes of parts. In contrast, heaping and supplying parts can avoid an increase in cost because parts are only placed in the pallet. Following a recent trend toward high-mix low-volume production, attention is paid to heaped supply capable of quickly coping with various parts.

In a conventional technique disclosed in Japanese Patent No. 04226623, if gripping of a part by a robot from a heap fails, the target part is excluded from gripping targets. Excluding the part, gripping of which has failed, can avoid a repetitive failure.

However, in the method disclosed in Japanese Patent No. 04226623, the number of gripping target candidates decreases because parts the robot has failed to grip are excluded from gripping targets. Since the number of heaped parts is limited, work cannot be performed efficiently if the number of candidates decreases.

SUMMARY OF THE INVENTION

The present invention has been made in consideration of the above-described problems, and provides a technique for, when gripping by a robot or assembly of a gripped part fails, returning (rearranging) the target part to its original state or a good state based on the gripping state so that efficient work is done without decreasing the number of gripping target candidates.

According to one aspect of the present invention, there is provided an information processing apparatus comprising: an area state determination unit which determines, based on a result of measurement by a first sensor, a state of an area where at least one target object is arranged a control unit which controls a robot to grip one target object among the at least one target object by a grip unit of the robot; a gripping state determination unit which determines a gripping state of a gripping target object gripped by the grip unit from a result of measuring the gripping target object by using a second sensor; and an area decision unit which, when gripping is determined based on the gripping state determined by the gripping state determination unit to have failed, decides, by using one of the result of measurement by the first sensor and the result of measurement by the second sensor, a rearrangement area where the gripping target object is to be rearranged wherein the control unit controls the robot to rearrange the gripping target object in the rearrangement area by the grip unit.

According to another aspect of the present invention, there is provided an information processing apparatus comprising: an area state determination unit which determines, based on a result of measurement by a first sensor, a state of an area where at least one target object is arranged; a control unit which controls a robot to grip one target object among the at least one target object by a grip unit of the robot; an assembly state determination unit which determines an assembly state of a gripping target object gripped by the grip unit from a result of measuring the gripping target object by using a second sensor; and an area decision unit which, when assembly is determined based on the assembly state determined by the assembly state determination unit to have failed, decides, by using the result of measurement by the first sensor, a rearrangement area where the gripping target object is to be rearranged, wherein the control unit controls the robot to rearrange the gripping target object in the rearrangement area by the grip unit.

According to still another aspect of the present invention, there is provided an information processing apparatus comprising: a robot including a grip unit; a first sensor; a second sensor; an area state determination unit which determines, based on a result of measurement by a first sensor, a state of an area where a set of at least one target object is arranged; a control unit which controls the robot to grip one target object among the at least one target object by the grip unit; a gripping state determination unit which determines a gripping state of a gripping target object gripped by the grip unit from a result of measuring the gripping target object by using a second sensor; and an area decision unit which, when gripping is determined based on the gripping state determined by the gripping state determination unit to have failed, decides, by using one of the result of measurement by the first sensor and the result of measurement by the second sensor, a rearrangement area where the gripping target object is to be rearranged, wherein the control unit controls the robot to rearrange the gripping target object in the rearrangement area by the grip unit.

According to yet another aspect of the present invention, there is provided an information processing apparatus comprising: a robot including a grip unit; a first sensor; a second sensor; an area state determination unit which determines, by using a first sensor, a state of an area where at least one target object that can be gripped by the grip unit exists; a control unit which controls the robot to grip one target object among the at least one target object by the grip unit; an assembly state determination unit which determines an assembly state of a gripping target object gripped by the grip unit from a result of measuring the gripping target object by using a second sensor; and an area decision unit which, when assembly is determined based on the assembly state determined by the assembly state determination unit to have failed, decides, by using the result of measurement by the first sensor, a rearrangement area where the gripping target object is to be rearranged, wherein the control unit controls the robot to rearrange the gripping target object in the rearrangement area by the grip unit.

According to yet another aspect of the present invention, there is provided an information processing method comprising: an area state determination step of determining, based on a result of measurement by a first sensor, a state of an area where at least one target object is arranged; a control step of controlling a robot to grip one target object among the at least one target object by a grip unit of the robot; a gripping state determination step of determining a gripping state of a gripping target object gripped by the grip unit from a result of measuring the gripping target object by using a second sensor; and an area decision step of, when gripping is determined based on the gripping state determined in the gripping state determination step to have failed, deciding, by using one of the result of measurement by the first sensor and the result of measurement by the second sensor, a rearrangement area where the gripping target object is to be rearranged, wherein in the control step, the robot is controlled to rearrange the gripping target object in the rearrangement area by the grip unit.

According to yet still another aspect of the present invention, there is provided an information processing method comprising: an area state determination step of determining, based on a result of measurement by a first sensor, a state of an area where at least one target object is arranged; a control step of controlling a robot to grip one target object among the at least one target object by a grip unit of the robot; an assembly state determination step of determining an assembly state of a gripping target object gripped by the grip unit from a result of measuring the gripping target object by using a second sensor; and an area decision step of, when assembly is determined based on the assembly state determined in the assembly state determination step to have failed, deciding, by using the result of measurement by the first sensor, a rearrangement area where the gripping target object is to be rearranged, wherein in the control step, the robot is controlled to rearrange the gripping target object in the rearrangement area by the grip unit.

Further features of the present invention will become apparent from the following description of exemplary embodiments with reference to the attached drawings.

BRIEF DESCRIPTION OF THE DRAWINGS

FIG. 1 is a view exemplifying the arrangement of a system;
FIGS. 2A to 2F are views for explaining a three-dimensional geometric model formed from polygon elements;
FIG. 3 is a view showing a CAD model and a geodesic sphere surrounding the CAD model;
FIG. 4 is a flowchart showing the operation of the system.

DESCRIPTION OF THE EMBODIMENTS

Figure 2C:
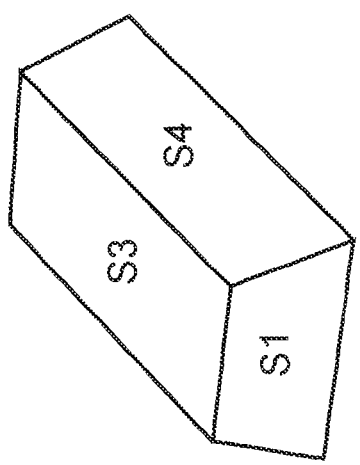

Embodiments of the present invention will now be described with reference to the accompanying drawings. Note that the embodiments to be explained below are examples of concretely practicing the present invention, and are detailed examples of an arrangement described in the claims.

First Embodiment

In the first embodiment, a state in a pallet in which target objects are heaped is measured using the first sensor (a projector and camera) for acquiring two-dimensional information (a two-dimensional image) and three-dimensional information (a range image or a two-dimensional image for obtaining three-dimensional point group data) about a target object. In the first embodiment, the position and orientation of a target object is used as the state in the pallet.

Further, the gripping state of a target object gripped by a robot is measured using the second sensor (a projector and camera) which is mounted on the robot and acquires three-dimensional information (a range image or a two-dimensional image for obtaining three-dimensional point group data) about a target object.

If it is determined that the gripping by the robot has failed, an area in the pallet to which the target object is to be returned (rearranging) is calculated based on the internal pallet state measured using the first sensor and the gripping state measured using the second sensor. Then, the robot is instructed to return the gripped target object to the return area. The robot returns the target object in accordance with the instruction.

First, the arrangement of a system according to the first embodiment will be exemplified with reference to FIG. 1.

A robot 100 is an articulated robot and operates in response to a control instruction from a robot controller unit 120. A hand serving as an end effector is mounted on the distal end of the robot 100 and can do work for a target object. In the embodiment, a hand with a chuck mechanism capable of gripping a target object is used as the end effector. The end effector may use a motor-driven hand or a suction pad for sucking a target object by air pressure.

Assume that calibration work has been performed in advance by a well-known technique for the position and orientation of a sensor unit 101, the positions and orbits of the robot 100 and the hand, and the relative position and orientation between the arm of the robot 100 and a sensor unit 102. This makes it possible to convert an internal pallet state measured by an area state measurement processing unit 113 and a gripping state measured by a gripping state measurement processing unit 115 into those in a work space coordinate system fixed in a space where a pallet 104 is placed. The robot 100 can also be controlled to move the hand to a position and orientation designated in the work space coordinate system.

The sensor unit 101 includes a projector and a camera for sensing a two-dimensional image as two-dimensional information. The sensor unit 101 is fixed above the pallet 104, senses an image of heaped target objects 103, and outputs the sensed image to a sensor information acquisition unit 111. Although an image processing unit 110 processes the image sensed by the sensor unit 101 in the embodiment, the sensor unit 101 may incorporate an image processing mechanism to output an image processing result. Assume that the relative positional relationship between the projector and camera of the sensor unit 101 has been obtained in advance by calibration.

The projector of the sensor unit 101 irradiates the target object 103 with a predetermined pattern image (pattern light) (projects the pattern image). The camera of the sensor unit 101 senses the target object 103 on which the pattern image is projected, and outputs the sensed image to the sensor information acquisition unit 111. As the predetermined pattern image, an image such as a plurality of stripe patterns or a plurality of line patterns having different widths in a space encoding method is used. A two-dimensional pattern or random dot pattern is also available. The area state measurement processing unit 113 uses the sensed image via the sensor information acquisition unit 111 to obtain a distance based on the principle of triangulation.

The projector of the sensor unit 101 can irradiate a target object with uniform-luminance light. The camera of the sensor unit 101 senses an image of the target object irradiated with the uniform-luminance light, and outputs a two-dimensional image to the sensor information acquisition unit 111.

The sensor unit 102 includes a compact projector and a compact camera for sensing a two-dimensional image. The sensor unit 102 is fixed and mounted near the hand whose position and orientation can be controlled (changed) by the angle of each joint of the robot 100. The sensor unit 102 senses a target object gripped by the hand. Assume that the relative positional relationship between the projector and camera of the sensor unit 102 has been obtained in advance by calibration. Although the image processing unit 110 processes an image sensed by the sensor unit 102 in the embodiment, the sensor unit 102 may incorporate an image processing mechanism to output an image processing result.

The projector of the sensor unit 102 irradiates the target object 103 with a predetermined pattern image (pattern light) (projects the pattern image). The camera of the sensor unit 102 senses the target object 103 on which the pattern image is projected, and outputs the sensed image to a sensor information acquisition unit 114. As the predetermined pattern image, an image such as a plurality of stripe patterns or a plurality of line patterns having different widths in a space encoding method is used. A two-dimensional pattern or random dot pattern is also available. The sensor unit 102 may include a diffraction grating, illuminator, and camera. In this case, the diffraction grating and illuminator project pattern light on a target object, and the camera senses the pattern. The gripping state measurement processing unit 115 uses the sensed image via the sensor information acquisition unit 114 to obtain a distance based on the principle of triangulation.

The target objects 103 are parts forming an industrial product. The robot 100 picks the target objects 103 and assembles them into a product. Various materials are usable, including plastic, metal, and vinyl. The target objects 103 are heaped in the pallet 104 in various orientations.

The pallet 104 is a box for containing the target objects 103. Although the material of the pallet is not limited, the pallet is often made of plastic or paper. Further, the shape of the pallet is not limited, but is often a cube or rectangular parallelepiped for ease of manufacturing. Also, the size of the pallet is not limited, but is generally determined so that it falls within a range measurable by the sensor unit 101.

Next, the image processing unit 110 functioning as an information processing apparatus will be described.

The sensor information acquisition unit 111 acquires a sensed image of the target objects 103 that has been obtained by the sensor unit 101, and outputs the acquired sensed image to the area state measurement processing unit 113. The sensor unit 101 includes the projector for emitting pattern light and uniform-luminance light. The sensor information acquisition unit 111 acquires a sensed image of the target object 103 irradiated with the pattern light and uniform-luminance light.

A model information holding unit 112 holds model information used to measure the position and orientation of the target object 103 by the area state measurement processing unit 113 and the gripping state measurement processing unit 115. An example of the model information is the three-dimensional geometric model of the target object 103 based on three-dimensional CAD. Another example of the model information is a reference image model which is a set of reference images obtained when the actual target object 103 or a three-dimensional geometric model simulating the target object 103 is viewed from a plurality of predetermined viewpoints.

The three-dimensional geometric model is a CAD model itself which can be handled by three-dimensional CAD software, or a model obtained by converting a three-dimensional CAD model into a plurality of polygon elements used in the computer graphics field. The embodiment adopts a three-dimensional geometric model formed from polygon elements. The three-dimensional geometric model formed from polygon elements will be explained with reference to FIGS. 2A to 2F.

Figure 2B:
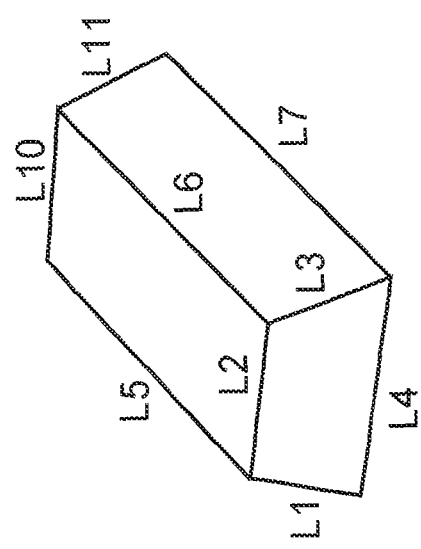
Figure 2A:
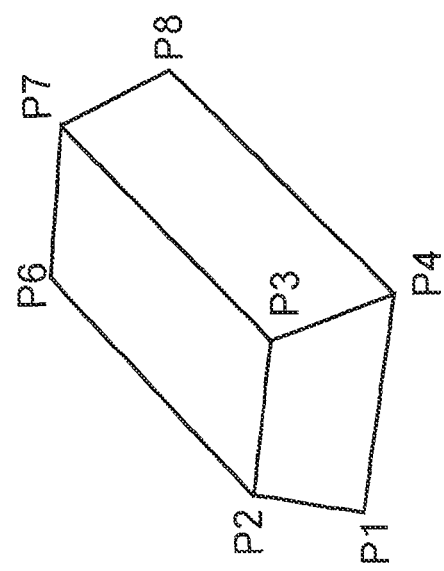

The three-dimensional geometric model formed from polygon elements includes building components such as points, lines, and surfaces as shown in FIGS. 2A to 2C. FIGS. 2A to 2C show the same three-dimensional geometric model.

For each vertex of the three-dimensional geometric model exemplified in FIG. 2A, model information of the three-dimensional geometric model formed from polygon elements manages the index of the vertex and the three-dimensional coordinate values of the vertex, as shown in FIG. 2D.

For each side of the three-dimensional geometric model exemplified in FIG. 2B, the model information manages the index of the side and the indices of vertices at the two ends of the side, as shown in FIG. 2E.

For each surface (polygon) of the three-dimensional geometric model exemplified in FIG. 2C, the model information manages the index of the polygon, the indices of the respective sides of the polygon, and the normal vector of the polygon, as shown in FIG. 2F.

A reference image model is data including a plurality of two-dimensional images. A reference image model based on an actually sensed image is created from images sensed with the camera from various directions by using the target object 103 as the center. A plurality of cameras may be arranged by setting up a scaffold for image sensing, the user may hold a camera to sense an image, or a camera mounted on the robot may sense an image while moving the robot. Although an image may be sensed by any method, the relative position and orientation between the camera and the target object 103 in image sensing is obtained and stored in association with the sensed image. When a plurality of cameras are arranged on the scaffold, the relative position and orientation can be obtained from the shape of the scaffold. When the user holds a camera, the relative position and orientation can be obtained from a position and orientation sensor by mounting it on the camera. When the camera mounted on the robot senses an image, the relative position and orientation can be obtained using control information of the robot.

As for a reference image model based on a three-dimensional geometric model simulating the target object 103, a geodesic sphere in which vertices have the same distance from the center of a CAD model is set, and an image viewed from each vertex of the geodesic sphere toward the center of the CAD model is used. The geodesic sphere has a plurality of vertices, and the distances between adjacent vertices are equal. A given vertex is set as a reference position, and a direction from which the CAD model is viewed is obtained based on the relative relationship with another vertex and is stored together with an image. FIG. 3 shows a CAD model and a geodesic sphere surrounding it. A set of images obtained by viewing the center from the respective vertices of the geodesic sphere is defined as a reference image model. Note that the reference image model may be a luminance image or a range image.

If it is already known that the target objects 103 are of only one type, model information of only this type is stored in the model information holding unit 112. If a plurality of types of target objects are dealt with, a plurality of types of model information are stored in the model information holding unit 112 and switched when used.

The area state measurement processing unit 113 obtains an area state (area state data) in the pallet 104 by using the sensed image of the target object 103 output from the sensor information acquisition unit 111 and the model information held by the model information holding unit 112. In the embodiment, the positions and orientations of one or more target objects (gripping candidate objects) which can be gripped by the hand of the robot 100, out of the target objects 103, are obtained as the area state data.

When a three-dimensional geometric model is used as model information, the position and orientation of the target object 103 is obtained by associating a line serving as a side of the three-dimensional geometric model with an edge component extracted from the sensed image output from the sensor information acquisition unit 111. In the embodiment, the coarse position and orientation of the three-dimensional geometric model is repeatedly corrected by an iterative operation so that the edge of the target object 103 coincides with a portion corresponding to the edge in the three-dimensional geometric model in the sensed image. The correction result is obtained as the position and orientation of the target object 103.

The position and orientation of the target object can also be obtained by associating point group data of a surface extracted from the three-dimensional geometric model with a distance point group extracted from a two-dimensional pattern image output from the sensor information acquisition unit 111. The distance point group can be obtained from the pattern image by using a well-known technique such as a space encoding method or light-section method, and this is not described in detail in the embodiment. To obtain the position and orientation of the target object by using the obtained distance point group and the model information, the embodiment adopts the ICP (Iterative Closest Point) method. The position and orientation of the target object is repeatedly corrected by an iterative operation. Further, the position and orientation of the target object can be obtained by taking account of both edge association and distance point group association.

When a reference image model is used as model information, a reference image which best matches a sensed image is obtained by template matching using the reference image model as a template, and the position and orientation of the target object 103 is obtained based on a relative position and orientation associated with the obtained reference image.

The area state measurement processing unit 113 outputs the positions and orientations of one or more gripping candidate objects to the robot work instruction unit 121 and a return area calculation unit 117. The robot work instruction unit 121 sends, to a robot control unit 122, an instruction signal which instructs to grip, by the hand, a gripping candidate object having one position and orientation among these positions and orientations.

The sensor information acquisition unit 114 acquires a sensed image of the target object 103 that has been obtained by the sensor unit 102, and outputs the acquired sensed image to the gripping state measurement processing unit 115.

The gripping state measurement processing unit 115 obtains the position and orientation of the target object 103 as a gripping state (gripping state data) by using the sensed image output from the sensor information acquisition unit 114 and model information held by the model information holding unit 112.

When a three-dimensional geometric model is used as model information, the position and orientation of the target object 103 is obtained by associating point group data of a surface extracted from the three-dimensional geometric model with a distance point group extracted from a sensed image output from the sensor information acquisition unit 114. By using a well-known technique such as a space encoding method or light-section method, the distance point group can be obtained from a sensed image of the target object 103 on which the pattern image is projected. To obtain the position and orientation of the target object 103 by using the obtained distance point group and the model information, the embodiment adopts the ICP (Iterative Closest Point) method. The position and orientation of the target object 103 is repeatedly corrected by an iterative operation. Note that the method of obtaining the position and orientation of the target object 103 is not limited to the ICP method.

When a reference image model is used as model information, a reference image which best matches a sensed image is obtained by template matching using the reference image model as a template, and the position and orientation of the target object 103 is obtained based on a relative position and orientation associated with the reference image.

The gripping state measurement processing unit 115 sends the thus-obtained "position and orientation of the target object gripped by the hand" to a determination unit 116 and the return area calculation unit 117.

The determination unit 116 determines whether gripping of a target object by the robot 100 (hand) has succeeded. Note that "gripping has succeeded" means that the robot 100 has gripped a target object in a predetermined position and orientation for subsequent predetermined work (for example, assembly work). "Gripping has failed (though the robot 100 grips a target object)" means that the robot 100 has not gripped the target object in a predetermined position and orientation for subsequent predetermined work (for example, assembly work).

Whether gripping of a target object by the robot 100 (hand) has succeeded is determined as follows. If the difference between a position and orientation obtained by the gripping state measurement processing unit 115, and a predetermined position and orientation calculated in advance as a position and orientation the hand should take to grip a target object is equal to or smaller than a threshold, it is determined that gripping has succeeded. If the difference is larger than the threshold, it is determined that gripping has failed. A failure in measurement itself by the gripping state measurement processing unit 115 is also regarded as a gripping failure.

If the determination unit 116 determines that gripping has succeeded, it instructs the robot work instruction unit 121 to perform predetermined work (for example, assembly work) by the robot 100. If the determination unit 116 determines that gripping has failed, it outputs information representing the gripping failure to the return area calculation unit 117 in order to return the target object into the pallet 104.

Upon receiving, from the determination unit 116, the information representing the failure in gripping by the robot 100, the return area calculation unit 117 obtains, by using the positions and orientations received from the area state measurement processing unit 113 and the gripping state measurement processing unit 115, an area (return area) to which the robot 100 is to return the target object.

A return instruction unit 118 obtains a position and orientation in which the robot 100 should return the target object in the return area, and instructs the robot work instruction unit 121 to return the target object in the position and orientation into the pallet 104 by the robot 100.

Next, the robot controller unit 120 will be described.

Based on the pieces of information obtained by the area state measurement processing unit 113, the determination unit 116, the return instruction unit 118, and the like, the robot work instruction unit 121 generates an instruction signal for moving the hand. For example, if the robot work instruction unit 121 receives the position and orientation of a target object from the area state measurement processing unit 113, it generates an instruction signal to move the hand to the position and orientation in which a target object in the received position and orientation can be gripped, and grip the target object. Further, the robot work instruction unit 121 generates an instruction signal to move the hand and perform predetermined work (for example, assembly work) in accordance with an instruction from the determination unit 116. The robot work instruction unit 121 generates an instruction signal which instructs to return the target object gripped by the robot 100 into the pallet 104 in accordance with an instruction from the return instruction unit 118.

Note that the robot work operations are not limited to movement, gripping, suction, and assembly, and also include other work operations such as inspection of the appearance of the target object 103, as a matter of course. Furthermore, the robot is not limited to an articulated robot, and may be a movable machine capable of NC control.

Upon receiving an instruction signal from the robot work instruction unit 121, a robot control unit 122 controls the operation of the robot 100 in accordance with the instruction signal. The position and orientation of the hand of the robot 100 can therefore be moved in accordance with the instruction signal.

The operation of the system according to the first embodiment will be described with reference to the flowchart of FIG. 4.

In step S401, the sensor unit 101 fixed above the pallet 104 senses an image of the target objects 103, and outputs the sensed image to the sensor information acquisition unit 111. Assume that the position and orientation of the sensor unit 101 has been obtained in advance by calibration. The sensor information acquisition unit 111 sends the sensed image of the target object 103, which has been received from the sensor unit 101, to the area state measurement processing unit 113.

In step S402, the area state measurement processing unit 113 obtains (measures), as an area state in the pallet 104, the position and orientation of at least one target object among a plurality of target objects in the sensed image received from the sensor information acquisition unit 111. This area state is used to control the robot to grip a target object or control it to return a target object, gripping of which has failed.

As the method of measuring the position and orientation of a target object, the embodiment will explain three methods. As the first method, the embodiment will explain a method of measuring the position and orientation of a target object 103 by performing matching between a two-dimensional image of the target object irradiated with uniform-luminance light that is output from the sensor information acquisition unit 111, and model information held by the model information holding unit 112. As the second method, the embodiment will explain a method of obtaining the position and orientation of a target object by performing matching between a distance point group extracted from a two-dimensional pattern image output from the sensor information acquisition unit 111, and point group data of a surface extracted from a three-dimensional geometric model. As the third embodiment, the embodiment will explain a method of obtaining the position and orientation of a target object by taking account of both edge association and distance point group association.

The method of measuring the position and orientation of the target object 103 by performing matching between a two-dimensional image of the target object irradiated with uniform-luminance light that is output from the sensor information acquisition unit 111, and model information held by the model information holding unit 112 will be described as the first method.

When a three-dimensional geometric model is used as the model information, the position and orientation of the target object is obtained by associating a line serving as a side of the three-dimensional geometric model of the target object with an edge component extracted from the sensed image output from the sensor information acquisition unit 111. In the embodiment, the coarse position and orientation (represented by a six-dimensional vector s) of the target object to be measured is repeatedly corrected by an iterative operation using the Gauss-Newton method, which is a kind of nonlinear optimization method, so that the three-dimensional geometric model is fitted in the sensed image. Note that the optimization method for obtaining the position and orientation of a target object is not limited the Gauss-Newton method.

Figure 5B:
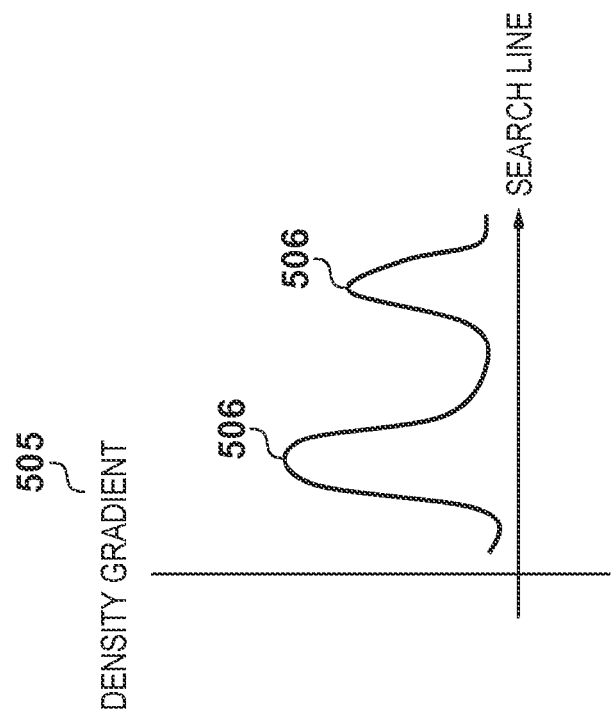
FIGS. 5A and 5B are views for explaining edge detection.
Figure 5A:
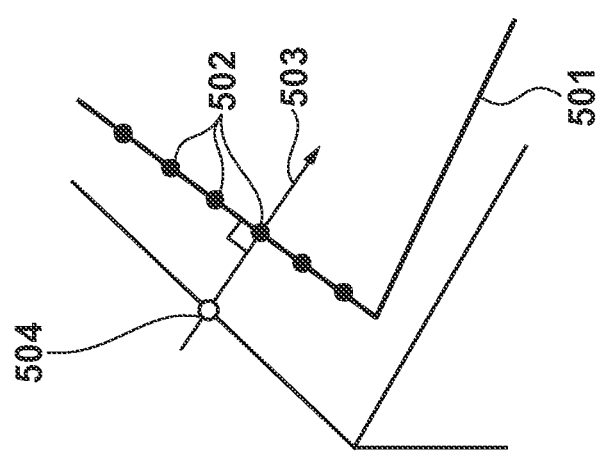

FIGS. 5A and 5B are views for explaining edge detection. A projection image, on the image, of each line segment forming the three-dimensional geometric model is calculated using the coarse position and orientation of the target object which has been obtained by some method (for example, template matching), and the calibrated internal parameters of the sensor unit 101. The projection image of a line segment is a line segment even on the image. Then, control points 502 are set on a projected line segment 501 at regular intervals on the image. For each control point 502, a one-dimensional edge 504 is detected in a direction 503 of the normal to the projected line segment 501 (FIG. 5A). Since an edge is detected as a local maximum of a density gradient 505 of a pixel value, a plurality of edges 506 may be detected, as shown in FIG. 5B. In the embodiment, all the detected edges are held.

To obtain the position and orientation of the target object by associating a line segment serving as a side of the three-dimensional geometric model with an edge component of the sensed image output from the sensor information acquisition unit 111, a coefficient matrix for calculating the position and orientation, and an error vector are calculated. Each element of the coefficient matrix is a first-order partial differential coefficient associated with each element of the position and orientation when the distance between a point and a straight line on the image is set as a function of the position and orientation. For an edge, the error vector is the signed distance between a projected line segment and a detected edge on the image. Derivation of the coefficient matrix will be described below.

Figure 6:
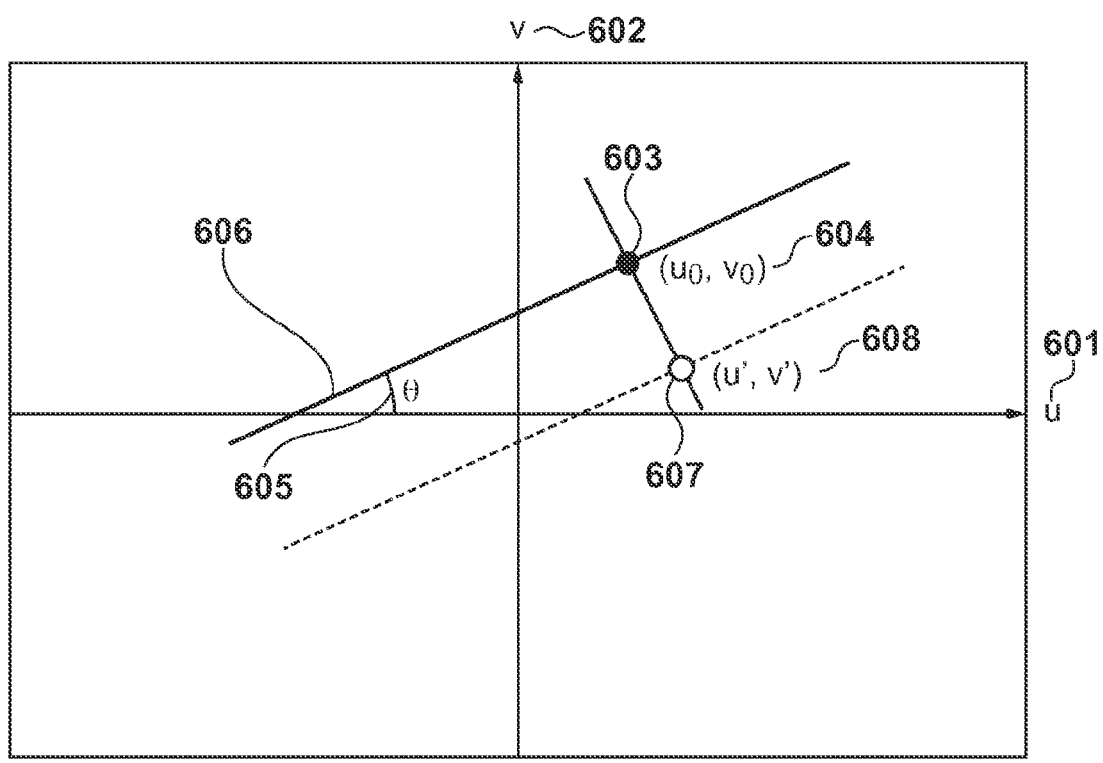
FIG. 6 is a graph for explaining the relationship between the projection image of a line segment and a detected edge.

FIG. 6 is a view for explaining the relationship between the projection image of a line segment and a detected edge. Referring to FIG. 6, a u-axis 601 represents the horizontal direction of the image and a v-axis 602 represents its vertical direction. (u0, v0) represents coordinates 604 of a given control point 603 (one of points which divide each projected line segment at regular intervals on the image) on the image. A slope θ 605 with respect to the u-axis 601 represents the slope, on the image, of the line segment to which the control point belongs. The slope θ 605 is calculated as the slope of a straight line obtained by projecting the three-dimensional coordinates of two ends of a line segment 606 on the image based on the six-dimensional vector s and connecting the coordinates of the two ends on the image. (sin θ, −cos θ) represents the normal vector of the line segment 606 on the image. (u', v') represents coordinates 608 of a point 607 corresponding to the control point 603 on the image. A point (u, v) on a straight line (a broken line in FIG. 6) which passes through the coordinates 608 (u', v') of the corresponding point 607 and has the slope θ 605 can be given by:

$$u \sin \theta - v \cos \theta = d$$

$$d = u' \sin \theta - v' \cos \theta \quad (1)$$

The position of the control point 603 on the image changes depending on the position and orientation of the target object. The position and orientation of the target object has six degrees of freedom. That is, s indicates a six-dimensional vector, and includes three elements representing the position of the target object and three elements representing its orientation. The three elements representing the orientation are expressed by, for example, Euler angles, or a three-dimensional vector, the direction of which represents a rotation axis passing through the origin, and the norm of which represents a rotation angle. The coordinates (u, v) of a point on the image that change depending on the position and orientation can be approximated by the first-order Taylor expansion near the coordinates 604 (u0, v0) according to expressions (2):

$$u \approx u_0 + \sum_{i=1}^{6} \frac{\partial u}{\partial s_i} \Delta s_i, \; v \approx v_0 + \sum_{i=1}^{6} \frac{\partial v}{\partial s_i} \Delta s_i \quad (2)$$

where $\Delta s_i$ (i=1, 2, ..., 6) is the infinitesimal change of each component of the six-dimensional vector s.

Assuming that the coarse position and orientation and the actual position and orientation are not so different, the position of the control point on the image, which is obtained by a correct six-dimensional vector s, can be assumed to exist on the straight line represented by equation (1). Substituting u and v approximated by expressions (2) into equation (1) yields equation (3):

$$\sin\theta \sum_{i=1}^{6} \frac{\partial u}{\partial s_i} \Delta s_i - \cos\theta \sum_{i=1}^{6} \frac{\partial v}{\partial s_i} \Delta s_i = d - r \quad (3)$$

where r=u0 sin θ−v0 cos θ (constant).

Equation (3) is applicable to all edges having undergone association. Note that equation (3) may be applied to only some edges instead of all edges. Since equation (3) is an equation for the infinitesimal change $\Delta s_i$ (i=1, 2, ..., 6) of each component of the six-dimensional vector s, linear simultaneous equations for $\Delta s_i$ can be set up as represented by equation (4):

$$\begin{bmatrix} \sin\theta_1 \frac{\partial u}{\partial s_1} - \cos\theta_1 \frac{\partial v}{\partial s_1} & \sin\theta_1 \frac{\partial u}{\partial s_2} - \cos\theta_1 \frac{\partial v}{\partial s_2} & \cdots & \sin\theta_1 \frac{\partial u}{\partial s_6} - \cos\theta_1 \frac{\partial v}{\partial s_6} \\ \sin\theta_2 \frac{\partial u}{\partial s_1} - \cos\theta_2 \frac{\partial v}{\partial s_1} & \sin\theta_2 \frac{\partial u}{\partial s_2} - \cos\theta_2 \frac{\partial v}{\partial s_2} & \cdots & \sin\theta_2 \frac{\partial u}{\partial s_6} - \cos\theta_2 \frac{\partial v}{\partial s_6} \\ \vdots & \vdots & \ddots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \end{bmatrix} \quad (4)$$

Here, equation (4) is rewritten into equation (5):

$$J\Delta s = E \quad (5)$$

To calculate the coefficient matrix J of the linear simultaneous equations, a partial differential coefficient is calculated. Based on equation (5), the correction value $\Delta s$ of the position and orientation is obtained based on the least squares criterion using the generalized inverse matrix $(J^T \cdot J)^{-1} \cdot J^T$ of the matrix J. However, there are many outliers for edges due to a detection error and the like, so a robust estimation method to be described below is adopted. For an edge as an outlier, the value of the error vector on the right-hand side of equation (4) generally becomes large. From this, a small weight is given to information in which the absolute value of an error is large, and a large weight is given to information in which an error is small. The weights are given by Tukey functions as represented by equations (6):

$$w(z(d-r)) = \begin{cases} (1 - (z(d-r)/c_1)^2)^2 & |z(d-r)| \le c_1 \\ 0 & |z(d-r)| > c_1 \end{cases} \quad (6)$$

$$w(e-q) = \begin{cases} (1 - ((e-q)/c_2)^2)^2 & |e-q| \le c_2 \\ 0 & |e-q| > c_2 \end{cases}$$

where $c_1$ and $c_2$ are constants.

A function to give weights need not be a Tukey function, and the function is arbitrary, such as a Huber function, as long as the function gives a small weight to information in which an error is large, and a large weight to information in which an error is small. Let $w_i$ be a weight corresponding to each piece of measurement information (an edge or point group data). Then, a weight matrix W is defined as represented by equation (7):

$$W = \begin{bmatrix} w_1 & & & 0 \\ & w_2 & & \\ & & \ddots & \\ 0 & & & \end{bmatrix} \quad (7)$$

The weight matrix W is a square matrix in which all components except for diagonal components are 0, and weights $w_i$ are substituted into the diagonal components. By using the weight matrix W, equation (5) is rewritten into equation (8):

$$WJ\Delta s = WE \quad (8)$$

The correction value $\Delta s$ is obtained by solving equation (8) as represented by equation (9):

$$\Delta s = (J^T W J)^{-1} J^T W E \quad (9)$$

The coarse position and orientation is corrected by solving the following equation using the calculated position and orientation correction value $\Delta s$:

$$s \leftarrow s + \Delta s$$

Whether the six-dimensional vector s has converged is determined. If the six-dimensional vector has converged, the calculation ends; otherwise, the calculation is repeated. When the correction value $\Delta s$ is almost 0, or the sum of squares of the error vector hardly changes before and after correction, it is determined that the six-dimensional vector s has converged. By repeating the calculation until the six-dimensional vector s converges, the position and orientation can be calculated.

The embodiment has described the use of the Gauss-Newton method as the optimization method. However, a Levenberg-Marquardt method which makes calculation more robust, or a steepest descent method as a simpler method may be used. Also, another nonlinear optimization calculation method such as a conjugate gradient method or ICCG method may be used.

When a reference image model is used as model information, a reference image which best matches a sensed image is obtained by template matching using the reference image model as a template, and the position and orientation of the target object is obtained based on a relative position and orientation associated with the reference image. Let $T(i, j)$ be the luminance of the reference image, and $I(i, j)$ be the luminance of the sensed image. Then, when the reference image is an image having m×n pixels, the degree R of coincidence between the reference image and the sensed image can be obtained according to equation (10):

$$R = \sum_{j=0}^{n-1} \sum_{i=0}^{m-1} (I(i, j) - T(i, j))^2 \quad (10)$$

Next, the method of obtaining the position and orientation of a target object by performing matching between a distance point group extracted from a two-dimensional pattern image output from the sensor information acquisition unit 111, and point group data of a surface extracted from a three-dimensional geometric model will be described as the second method.

The distance point group can be obtained from the pattern image by using a well-known technique such as a space encoding method or light-section method, and this is not described in detail in the embodiment. To associate the point group of the three-dimensional geometric model with the range image point group, the embodiment adopts the ICP (Iterative Closest Point) method. A surface point group P of the three-dimensional geometric model is defined by:

$$P = \{p_1, p_2, \ldots, p_{N_p}\} \quad (11)$$

Also, a range image point group A is defined by:

$$A = \{a_1, a_2, \ldots, a_{N_a}\} \quad (12)$$

The surface point group P of the three-dimensional geometric model is converted to be aligned with the distance point group A. Assuming that a point of the point group A that has a shortest distance to each point pi of the point group P is represented by $b_i \in A$, an error function (13) can be defined by:

$$E(R, t) = \sum_{i=1}^{N_p} \|b_i - (Rp_i + t)\|^2 \quad (13)$$

where R is the orientation parameter, and t is the motion vector.

R and t which decrease the error function E are obtained to perform correction according to expression (14):

$$P \leftarrow RP + t \quad (14)$$

The method of obtaining R and t which decrease the error function E is described in K. S. Arun, T. S. Huang, and S. D. Blostein, "Least-Squares Fitting of Two 3-D Point Sets", PAMI, Vol. 9, No. 5, 1987.

Whether P has converged is determined. If P has converged, the correction calculation ends; otherwise, the correction calculation is repeatedly performed. For example, when P has hardly changed, it is determined that P has converged. The position and orientation can be calculated by repeating the correction calculation until P converges.

Finally, as the third method, the position and orientation of a target object can also be obtained by taking account of both edge association and distance point group association. This method can be implemented by applying, for example, a method disclosed in Japanese Patent Laid-Open No. 2011-27623.

After the area state measurement processing unit 113 obtains the position and orientation of the gripping candidate object as area state data in step S402, it sends the obtained position and orientation to the robot work instruction unit 121 and the return area calculation unit 117. If the area state measurement processing unit 113 obtains the positions and orientations of a plurality of gripping candidate objects, it sends all the obtained positions and orientations to the robot work instruction unit 121 and the return area calculation unit 117.

In step S403, the robot work instruction unit 121 generates an instruction signal to move the hand of the robot 100 to the position and orientation received from the area state measurement processing unit 113, and sends the generated instruction signal to the robot control unit 122. If the robot 100 includes a pad for sucking the target object, the robot work instruction unit 121 generates, based on the position and orientation received from the area state measurement processing unit 113, an instruction signal to move the pad of the robot 100 to a position and orientation where it can suck the target object 103.

Figure 7:
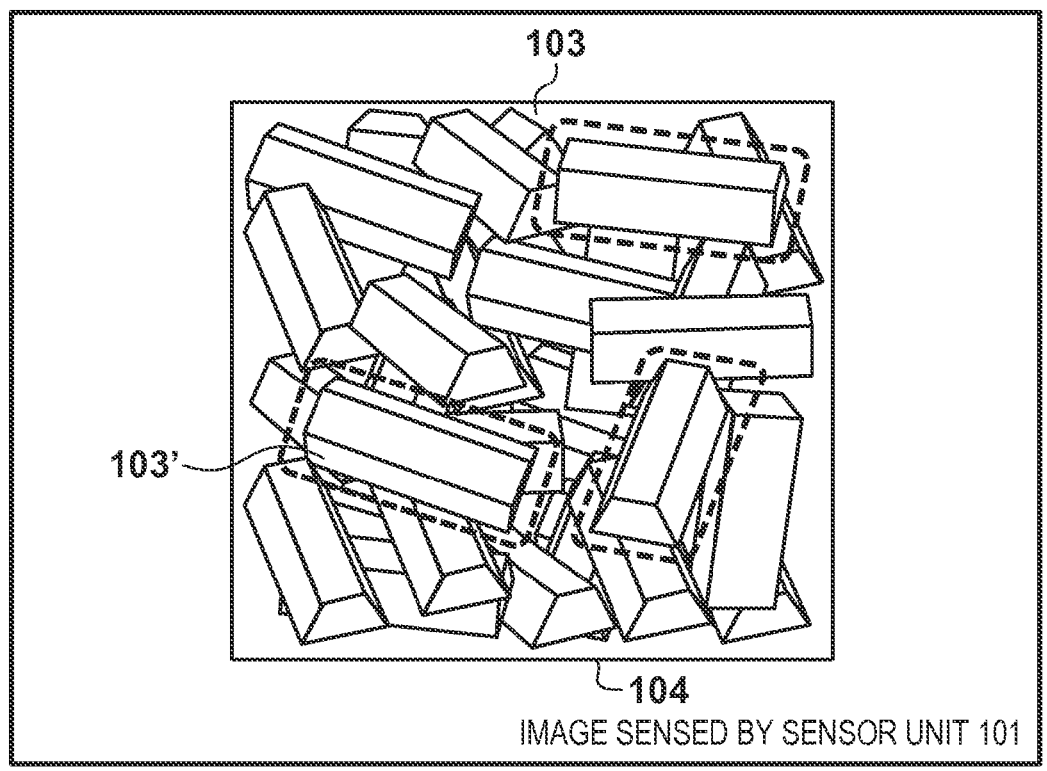
FIG. 7 is a view showing a sensed image.

When the robot work instruction unit 121 receives the positions and orientations of a plurality of gripping candidate objects from the area state measurement processing unit 113, it selects the position and orientation of one gripping candidate object from them. For example, the robot work instruction unit 121 selects a gripping candidate object at the top (a gripping candidate object having, of position components, a largest coordinate component in the normal direction on the side on which the pallet 104 is placed, with respect to the surface on which the pallet 104 is placed) that is highly likely to be able to be picked from the heap. FIG. 7 shows target objects (gripping candidate objects), surrounded by dotted lines, whose positions and orientations have been obtained from an image sensed by the sensor unit 101. As is apparent from FIG. 7, the positions and orientations of three gripping candidate objects have been obtained. Of these three gripping candidate objects, a top gripping candidate object 103' is selected as a gripping target object. Note that the dotted lines in FIG. 7 are illustrated merely for descriptive convenience and do not appear in an actual image.

In step S404, the robot control unit 122 controls the robot 100 in accordance with the instruction signal from the robot work instruction unit 121, and moves the hand to a position and orientation indicated by the instruction signal. When the robot 100 is to grip the gripping candidate object 103', the robot control unit 122 controls the robot 100 to grip the gripping candidate object 103'. When the robot 100 is to suck the gripping candidate object 103', the robot control unit 122 controls the robot 100 to suck the gripping candidate object 103'.

In step S405, the sensor unit 102 mounted on the hand senses the gripping target object gripped by the hand, and sends the sensed image to the sensor information acquisition unit 114. The sensor unit 102 includes a projector for emitting pattern light, and the sensor information acquisition unit 114 acquires an image of the gripping target object irradiated with pattern light.

In step S406, the gripping state measurement processing unit 115 obtains the position and orientation of the gripping target object by using the sensed image of the gripping target object acquired from the sensor information acquisition unit 114 and the model information held by the model information holding unit 112. To obtain the position and orientation of the gripping target object, the model information holding unit 112 outputs the model information held by it.

When a three-dimensional geometric model is used as model information, the position and orientation of the target object is obtained by associating a point group extracted from a surface of the three-dimensional geometric model with a range image point group obtained from the sensed image output from the sensor information acquisition unit 114. The distance point group can be obtained from the pattern image by using a well-known technique such as a space encoding method or light-section method, and this is not described in detail in the embodiment. The point group of the three-dimensional geometric model can be associated with the range image point group by using the ICP (Iterative Closest Point) method described in the second method in step S402.

When a reference image model is used as model information, a reference image which best matches the sensed image is obtained by template matching using the reference image model as a template, and the position and orientation of the target object is obtained based on a relative position and orientation associated with the reference image. The detailed method has been described in the second half of the first method in step S402.

Upon obtaining the position and orientation of the gripping target object, the gripping state measurement processing unit 115 sends it to the determination unit 116 and the return area calculation unit 117. If the gripping state measurement processing unit 115 has failed in position and orientation detection based on the model owing to a large gripping deviation or the like, it outputs a message indicative of this to the determination unit 116.

In step S407, the determination unit 116 determines whether the gripping has succeeded, by comparing the position and orientation obtained by the gripping state measurement processing unit 115 with a position and orientation taught by teaching work or the like in advance in which the gripping target object should be gripped. For example, the determination unit 116 compares these positions and orientations, and if the relative position is equal to or smaller than 200 µm and the relative angle (each of the x, y, and z components) is equal to or smaller than 0.5°, determines that the relative position and relative angle fall within an allowance range capable of assembly and that the gripping has succeeded. If these conditions are not satisfied or the gripping state measurement processing unit 115 fails in position and orientation detection, the determination unit 116 determines that the gripping has failed.

If the determination unit 116 determines that the gripping has succeeded, the process advances to step S408. If the determination unit 116 determines that the gripping has failed, the process advances to step S409.

In step S408, the determination unit 116 instructs the robot work instruction unit 121 to control the robot 100 to perform predetermined work (for example, assembly work).

In step S409, the determination unit 116 outputs information representing the gripping failure to the return area calculation unit 117 in order to return the gripping target object into the area of the pallet 104. Upon receiving the information, the return area calculation unit 117 obtains an area in the pallet 104 to which the gripping target object is to be returned. In the embodiment, the position and orientation of the gripping candidate object is used as the area state.

Figure 8A:
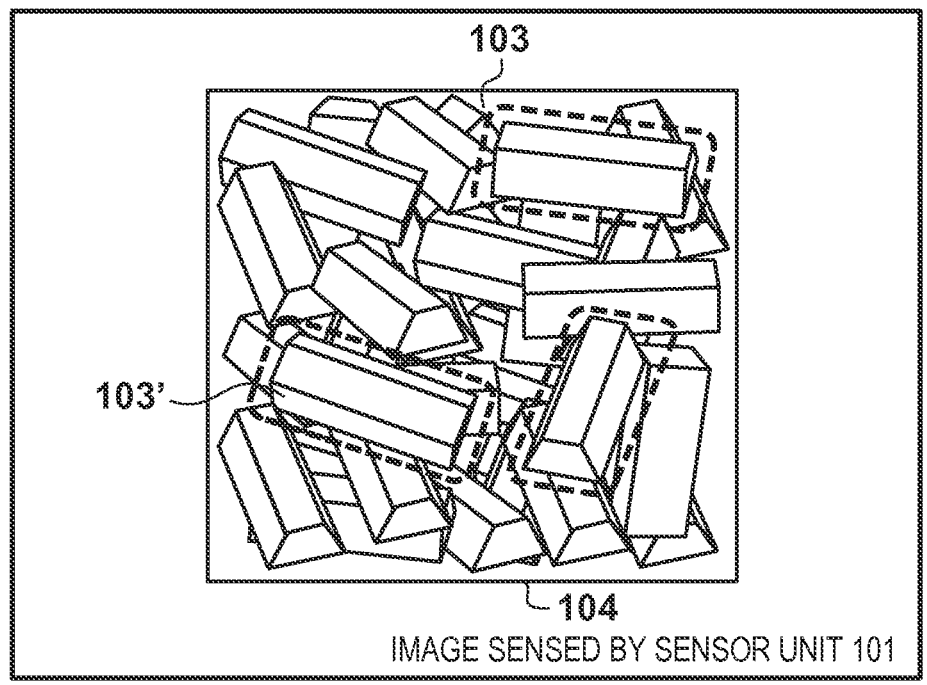
FIGS. 8A and 8B are views each showing a sensed image.
Figure 8B:
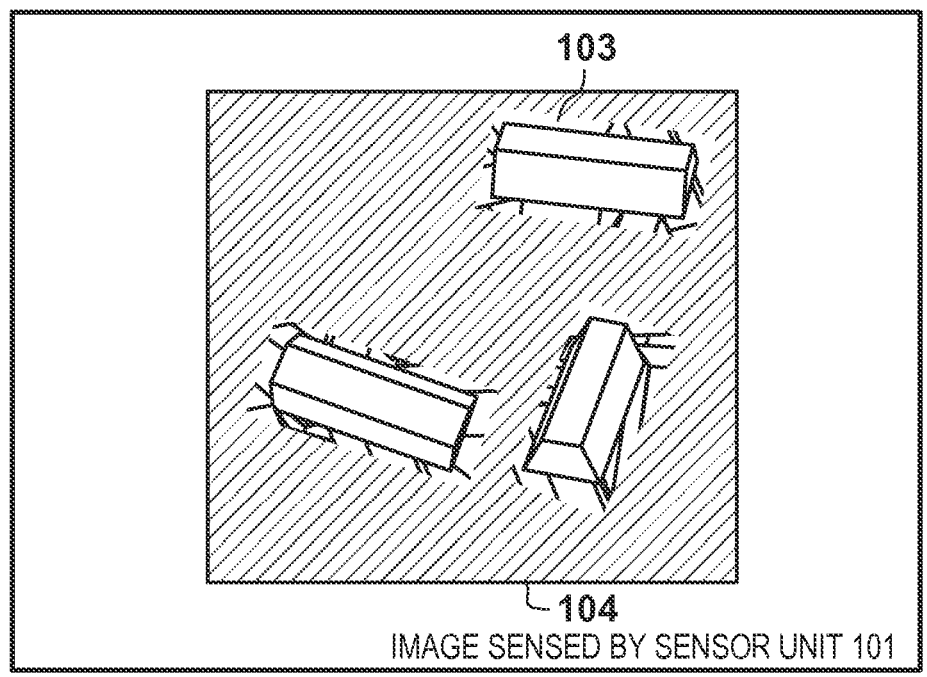

A method of calculating a return area by using the position and orientation of the gripping candidate object in the pallet 104 that has been measured by the area state measurement processing unit 113 will be explained. In the embodiment, an area avoiding gripping candidate objects in the pallet 104 is calculated as the return area. The gripping candidate object is an object which can be gripped by the robot in a good state. Hence, if a gripped object is returned to stack it on gripping candidate objects, it is undesirably excluded from gripping candidates in the next cycle. FIG. 8A shows an image sensed by the sensor unit 101, similar to FIG. 7. The gripping candidate object 103' is gripped by the robot in step S404, and it is determined in step S409 that the gripping has failed. Since FIG. 8A shows an image sensed in step S401, the gripping candidate object 103' does not exist in the pallet 104 at the time of step S409 and is gripped by the robot. Target objects surrounded by dotted lines in FIG. 8A are target objects (that is, gripping candidate objects) whose positions and orientations have been measured in step S402. The return area is defined as an area spaced apart by, for example, 30 pixels or more from these gripping candidate objects in the internal pallet area. In FIG. 8B, the return area is hatched. In FIG. 8B, the portion of the gripping candidate object 103' shown in FIG. 8A is not included in the return area. This is because an object to serve as a gripping candidate may appear from below the gripping candidate object 103' in the next cycle. Needless to say, the area of the gripping candidate object 103' may be included in the return area. Return to an area avoiding gripping candidate objects enables efficient work without hiding gripping candidates.

Note that the area of a gripping candidate object in a sensed image is an area obtained by projecting, onto the sensed image, the three-dimensional geometric model of the gripping candidate object having the position and orientation of the gripping candidate object. Therefore, the return area hatched in FIG. 8B can be obtained as an area excluding the projected area. This can be achieved by performing the above-mentioned calibration in advance. The method of obtaining the hatched area is not limited to this, as a matter of course.

The return area may be calculated using gripping state data of a gripping target object by the robot 100. For example, a gripping target object gripped by the robot 100 need not be returned near a target object having a position and orientation similar to that of the gripping target object in order not to mistake the returned target object for a peripheral target object.

In short, the return area calculation unit 117 specifies, as the return area, "an area on the surface on which the pallet 104 is placed" corresponding to an area excluding the area of a gripping candidate object in an image sensed by the sensor unit 101.

In step S410, the return instruction unit 118 instructs the robot work instruction unit 121 to return the gripping target object. The position to which the gripping target object is returned is decided so that the gripping target object falls within the area specified in step S409. For example, the gripping target object is returned to a position which is closest to the end effector of the robot 100 at the time of receiving the return instruction in the area calculated in step S409. The method of deciding an orientation in which the gripping target object is returned changes depending on whether the gripping state has been measured. If the gripping state has been measured, an orientation in which gripping or assembly will easily succeed is determined in advance, and the robot 100 is controlled to take this orientation and return the gripping target object. If no gripping state has been measured, the gripping target object may be directly returned to the heap in the pallet 104, or the robot 100 may be controlled to greatly change the orientation and return the gripping target object in order to avoid the same failure.

In step S411, the robot work instruction unit 121 generates an instruction signal to control the robot 100 to execute the contents of the instruction received in step S408 or S410, and sends it to the robot control unit 122. The robot control unit 122 controls the robot 100 in accordance with the instruction signal.

In step S412, it is determined whether an end instruction has been received. If no end instruction has been received, the process returns to step S401. If an end instruction has been received, the sequence ends to stop all the operations. Note that the user may press an emergency stop button (not shown) to end the sequence and stop all the operations without waiting for the end determination in step S412.

As described above, according to the first embodiment, the position and orientation of a gripping candidate object is measured using a fixed sensor, and the gripping state is measured using a sensor mounted on the robot. If it is determined that the gripping by the robot has failed, the target object is returned to its original state or a good state based on the gripping state. This enables efficient work without decreasing the number of gripping target objects.

Note that the above arrangement is merely an example of the following arrangement, and several arrangements to be described in the second and subsequent embodiments are also merely examples of the following arrangement. More specifically, the state of an area where a set of one or more target objects which can be gripped by the grip unit of a robot exists is obtained using the first sensor (first calculation). The robot is then controlled to grip one of these target objects by the grip unit. The target object gripped by the grip unit is set as a gripping target object, and the gripping state of the gripping target object is obtained from the result of measuring the gripping target object by using the second sensor (second calculation). If it is determined based on the gripping state calculated by the second calculation that the gripping has failed, an area where the gripping target object is to be arranged is obtained using the result of measurement by the first sensor or that of measurement by the second sensor (third calculation). Based on calculation by the third calculation, the robot is controlled to arrange the gripping target object in the area by the grip unit.

Second Embodiment

The second embodiment uses two-dimensional image feature information such as a feature point or edge as an area state in a pallet 104. The arrangement of a system according to the second embodiment is the same as that in the first embodiment except for the contents of processes to be performed by an area state measurement processing unit 113, return area calculation unit 117, and return instruction unit 118.

The operation of the system according to the second embodiment basically complies with the flowchart of FIG. 4 except that the contents of processes in steps S402, S409, and S410 are different from those in the first embodiment.

Only a difference from the first embodiment will therefore be explained below, and the remaining part is the same as that in the first embodiment, unless otherwise specified.

The area state measurement processing unit 113 measures an area state in the pallet 104 based on a sensed image output from a sensor information acquisition unit 111 and model information held by a model information holding unit 112. In the second embodiment, as the area state in the pallet 104, a two-dimensional image feature such as a feature point or edge is measured in addition to the position and orientation of a target object (gripping candidate object) which can be gripped by a robot 100.

Similar to the first embodiment, the area state measurement processing unit 113 outputs the position and orientation of a measured target object to a robot work instruction unit 121 to instruct the robot 100 to grip the target object. Also, the area state measurement processing unit 113 outputs, to the return area calculation unit 117, the two-dimensional image feature such as a feature point or edge contained in the measured area state.

The return area calculation unit 117 receives, from a determination unit 116, information representing that the gripping by the robot 100 has failed, and further receives area state data output from the area state measurement processing unit 113 and gripping state data output from a gripping state measurement processing unit 115. Upon receiving these pieces of information, the return area calculation unit 117 calculates a return area to which the robot 100 should return the target object. The return area calculation unit 117 outputs, to the return instruction unit 118, the area state data, the gripping state data, and data representing the calculated return area.

The return instruction unit 118 receives, from the return area calculation unit 117, the area state data, the gripping state data, and the data representing the return area. Upon receiving these pieces of information, the return instruction unit 118 obtains a position and orientation in which the robot 100 should return the target object, and instructs the robot work instruction unit 121 to return the target object into the pallet 104 by the robot 100, similar to the first embodiment.

In step S402, the area state measurement processing unit 113 measures, as an area state in the pallet 104 from an image acquired by the sensor information acquisition unit 111, the position and orientation of at least one gripping candidate object among a plurality of target objects. Further, the area state measurement processing unit 113 extracts a two-dimensional image feature from a sensed image of the target object irradiated with uniform-luminance light that is output from the sensor information acquisition unit 111. The two-dimensional image feature can be extracted by, for example, using a differentiation filter such as a Sobel filter or Laplacian filter or obtaining a SIFT feature by calculation.

After the area state measurement processing unit 113 obtains the position and orientation of the gripping candidate object in step S402, it outputs the obtained position and orientation to the robot work instruction unit 121. The area state measurement processing unit 113 outputs the two-dimensional image feature such as a feature point or edge to the return area calculation unit 117.

In step S409, the determination unit 116 outputs information representing the gripping failure to the return area calculation unit 117 in order to return the gripping target object into the area of the pallet 104. Upon receiving the information, the return area calculation unit 117 obtains an area in the pallet 104 to which the gripping target object is to be returned. In the embodiment, the two-dimensional image feature such as a feature point or edge is used as the area state.

Figure 9A:
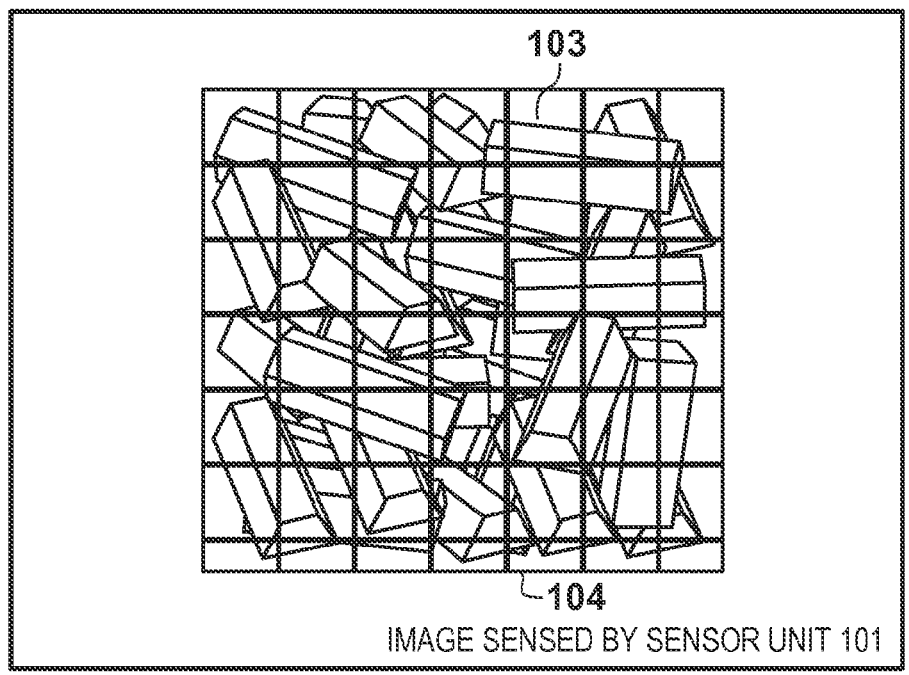
FIGS. 9A and 9B are views each showing a sensed image.
Figure 9B:
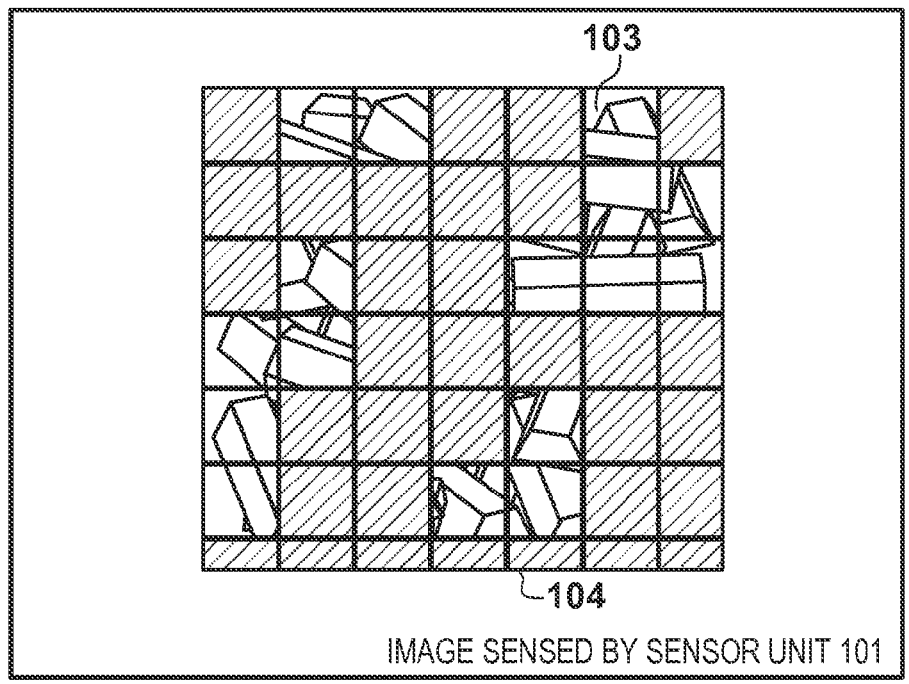

A method of calculating a return area by using the two-dimensional image feature (an edge or feature point) in the pallet 104 that has been measured by the area state measurement processing unit 113 will be explained. In the embodiment, an area having extremely many or a few two-dimensional image features in the pallet 104 is calculated as the return area. An area having extremely many two-dimensional image features is an area where target objects are tangled with each other or target objects cause diffuse reflection of light. An area having extremely a few two-dimensional image features is an area where light from a projector is directly reflected to generate specular or another object casts a shadow. These areas are areas where it is difficult to measure the position and orientation of the target object unless the heaped state greatly changes, because the amount of two-dimensional image features is not appropriate. FIG. 9A shows an image sensed by a sensor unit 101, similar to FIG. 7. In FIG. 9A, the sensed image (in the pallet 104) is divided into, for example, grids of 100×100 pixels, and the amount of two-dimensional image features detected in the grid is counted. Grids except for those in which the two-dimensional feature amount reaches a predetermined ratio (for example, 5% to 95%) are defined as the return area where it is difficult to obtain the position and orientation of the target object. In FIG. 9B, the return area is hatched.

In short, the return area calculation unit 117 specifies, as the return area, "an area on the surface on which the pallet 104 is placed" corresponding to an area having two-dimensional image features in an amount falling outside a predetermined range in an image sensed by the sensor unit 101.

In step S410, the return instruction unit 118 instructs the robot work instruction unit 121 to return a gripping target object 103'. The position to which the gripping target object 103' is returned is decided so that the gripping target object 103' falls within the area specified in step S409. For example, the gripping target object 103' is returned to a position which is closest to the end effector of the robot 100 at the time of receiving the return instruction in the area calculated in step S409. The method of deciding an orientation in which the gripping target object 103' is returned changes depending on whether the gripping state has been measured. If the gripping state has been measured, an orientation in which gripping or assembly will easily succeed is determined in advance, and the robot 100 is controlled to take this orientation and return the gripping target object 103'. If no gripping state has been measured, the gripping target object 103' may be directly returned to the heap in the pallet 104, or the robot 100 may be controlled to greatly change the orientation and return the gripping target object 103' in order to avoid the same failure.

As described above, according to the second embodiment, when gripping by the robot fails, the target object is returned to an area where it is difficult to obtain the position and orientation of a target object unless the heaped state greatly changes. This enables efficient work because an area where the position and orientation of a target object can be easily obtained is not affected.

Third Embodiment

The third embodiment uses three-dimensional information such as a range measurement state as an area state in a pallet. The arrangement of a system according to the third embodiment is the same as that in the first embodiment except for the contents of processes to be performed by an area state measurement processing unit 113, return area calculation unit 117, and return instruction unit 118.

The operation of the system according to the third embodiment basically complies with the flowchart of FIG. 4 except that the contents of processes in steps S402, S409, and S410 are different from those in the first embodiment.

Hence, only a difference from the first embodiment will be explained below, and the remaining part is the same as that in the first embodiment, unless otherwise specified.

The area state measurement processing unit 113 measures an area state in a pallet 104 based on a sensed image output from a sensor information acquisition unit 111 and model information held by a model information holding unit 112. In the third embodiment, as the area state in the pallet 104, three-dimensional information such as a range measurement state is measured in addition to the position and orientation of a target object which can be gripped by a robot 100.

Similar to the first embodiment, the area state measurement processing unit 113 outputs the position and orientation of a measured target object to a robot work instruction unit 121 to instruct the robot 100 to grip the target object. Also, the area state measurement processing unit 113 outputs, to the return area calculation unit 117, the three-dimensional information such as a range measurement state contained in the measured area state.

The return area calculation unit 117 receives, from a determination unit 116, information representing that the gripping by the robot 100 has failed, and further receives area state data output from the area state measurement processing unit 113 and gripping state data output from a gripping state measurement processing unit 115. Upon receiving these pieces of information, the return area calculation unit 117 calculates a return area to which the robot 100 should return the target object. The return area calculation unit 117 outputs, to the return instruction unit 118, the area state data, the gripping state data, and data representing the calculated return area.

The return instruction unit 118 receives, from the return area calculation unit 117, the area state data, the gripping state data, and the data representing the return area. Upon receiving these pieces of information, the return instruction unit 118 obtains a position and orientation in which the robot 100 should return the target object, and instructs the robot work instruction unit 121 to return the target object into the pallet 104 by the robot 100, similar to the first embodiment.

In step S402, the area state measurement processing unit 113 measures, as an area state in the pallet 104 from an image acquired by the sensor information acquisition unit 111, the position and orientation of at least one gripping candidate object among a plurality of target objects. Further, the area state measurement processing unit 113 extracts three-dimensional information such as a range measurement state based on a sensed image (pattern image) output from the sensor information acquisition unit 111. The range measurement state means a state representing whether a range image extracted from a two-dimensional pattern image output from the sensor information acquisition unit 111 has been measured appropriately in correspondence with each pixel of the camera of a sensor unit 101. Pixels whose distance value is unknown because no correspondence has been obtained from the obtained range image, and pixels falling outside an assumed distance range (for example, a pixel measured to exist on a side opposite to the camera with respect to the bottom surface of the pallet or to have a height of 20 cm or more from the bottom surface of the pallet toward the camera) are determined as pixels in a poor range measurement state. The remaining pixels are determined as pixels in a good range measurement state. The range image can be obtained from the pattern image by using a well-known technique such as a space encoding method or light-section method.

After the area state measurement processing unit 113 obtains the position and orientation of the gripping candidate object in step S402, it outputs the obtained position and orientation to the robot work instruction unit 121. The area state measurement processing unit 113 outputs the three-dimensional information such as a range measurement state to the return area calculation unit 117.

In step S409, the determination unit 116 outputs information representing the gripping failure to the return area calculation unit 117 in order to return the gripping target object into the area of the pallet 104. Upon receiving the information, the return area calculation unit 117 obtains an area in the pallet 104 to which the gripping target object is to be returned. In the embodiment, the three-dimensional information such as a range measurement state is used as the area state.

A method of calculating a return area by using the range measurement state in the pallet 104 that has been measured by the area state measurement processing unit 113 will be explained. In the embodiment, areas where there are many pixels whose distance value is unknown from the range measurement state in the pallet 104, and there are many pixels falling outside an assumed distance range (for example, a pixel measured to exist on a side opposite to the camera with respect to the bottom surface of the pallet or to have a height of 20 cm or more from the bottom surface of the pallet toward the camera) are calculated as the return area. These areas are areas where pattern light from the projector and an image sensed by the camera are not associated with each other, in other words, the range measurement state is poor and it is difficult to obtain the position and orientation of a target object. Similar to FIG. 9A, the interior of the pallet 104 in the range image is divided into, for example, grids of 100×100 pixels, and pixels in a poor range measurement state that are detected in the grid are counted. Grids in which pixels in a poor range measurement state exist at a predetermined ratio (for example, 50%) or more are defined as the return area where it is difficult to obtain the position and orientation of the target object.

In short, the return area calculation unit 117 specifies, as the return area, "an area on the surface on which the pallet 104 is placed" corresponding to an area satisfying a condition representing that the range measurement state is poor in a range image obtained by the sensor unit 101.

In step S410, the return instruction unit 118 instructs the robot work instruction unit 121 to return a gripping target object 103'. The position to which the gripping target object 103' is to be returned is decided so that the gripping target object 103' falls within the area calculated in step S409. For example, the gripping target object 103' is returned to a position which is closest to the end effector of the robot 100 at the time of receiving the return instruction in the area specified in step S409. The method of deciding an orientation in which the gripping target object 103' is returned changes depending on whether the gripping state has been measured. If the gripping state has been measured, an orientation in which gripping or assembly will easily succeed is determined in advance, and the robot 100 is controlled to take this orientation and return the gripping target object 103'. If no gripping state has been measured, the gripping target object 103' may be directly returned to the heap in the pallet 104, or the robot 100 may be controlled to greatly change the orientation and return the gripping target object 103' in order to avoid the same failure.

As described above, according to the third embodiment, when gripping by the robot fails, the target object is returned to an area where the range measurement state is poor and it is difficult to obtain the position and orientation of a target object. This enables efficient work because an area where the position and orientation of a target object can be easily obtained is not affected.

Fourth Embodiment

The fourth embodiment uses a distance distribution in a pallet as an area state in the pallet. The arrangement of a system according to the fourth embodiment is the same as that in the first embodiment except for the contents of processes to be performed by an area state measurement processing unit 113, return area calculation unit 117, and return instruction unit 118.

The operation of the system according to the fourth embodiment basically complies with the flowchart of FIG. 4 except that the contents of processes in steps S402, S409, and S410 are different from those in the first embodiment.

Thus, only a difference from the first embodiment will be explained below, and the remaining part is the same as that in the first embodiment, unless otherwise specified.

The area state measurement processing unit 113 measures an area state in a pallet 104 based on a sensed image output from a sensor information acquisition unit 111 and model information held by a model information holding unit 112. In the fourth embodiment, as the area state in the pallet 104, a distance distribution in the pallet is measured in addition to the position and orientation of a target object which can be gripped by a robot 100.

The area state measurement processing unit 113 outputs the position and orientation information of a measured target object to a robot work instruction unit 121 to instruct the robot 100 to grip the target object. Also, the area state measurement processing unit 113 outputs, to the return area calculation unit 117, the distance distribution in the pallet contained in the measured area state.

The return area calculation unit 117 receives, from a determination unit 116, information representing that the gripping by the robot 100 has failed, and further receives area state data output from the area state measurement processing unit 113 and gripping state data output from a gripping state measurement processing unit 115. Upon receiving these pieces of information, the return area calculation unit 117 calculates a return area to which the robot 100 should return the gripping target object. The return area calculation unit 117 outputs, to the return instruction unit 118, the area state data, the gripping state data, and data representing the calculated return area.

The return instruction unit 118 receives, from the return area calculation unit 117, the area state data, the gripping state data, and the data representing the return area. Upon receiving these pieces of information, the return instruction unit 118 obtains a position and orientation in which the robot 100 should return the gripping target object, and instructs the robot work instruction unit 121 to return the gripping target object into the pallet 104 by the robot 100.

In step S402, the area state measurement processing unit 113 measures, as an area state in the pallet 104 from an image acquired by the sensor information acquisition unit 111, the position and orientation of at least one gripping candidate object among a plurality of target objects. Further, the area state measurement processing unit 113 extracts a distance distribution in the pallet based on a pattern image output from the sensor information acquisition unit 111. The distance distribution means a distance distribution on the surface when target objects in the pallet 104 are viewed from the sensor unit 101. A range image obtained from a two-dimensional pattern image output from the sensor information acquisition unit 111 is defined as a distance distribution. The range image can be obtained from the pattern image by using a well-known technique such as a space encoding method or light-section method. Pixels whose distance value is unknown in the obtained range image, and pixels falling outside an assumed distance range (for example, a pixel measured to exist on a side opposite to the camera with respect to the bottom surface of the pallet or to have a height of 20 cm or more from the bottom surface of the pallet toward the camera) are determined as "pixels in a poor range measurement state". The "pixels in a poor range measurement state" may be interpolated using the distance values of surrounding pixels in a good range measurement state. This can provide a continuous distance distribution.

After the area state measurement processing unit 113 obtains the position and orientation of the gripping candidate object in step S402, it outputs the position and orientation of the gripping candidate object to the robot work instruction unit 121. The area state measurement processing unit 113 outputs the distance distribution to the return area calculation unit 117.

In step S409, the determination unit 116 outputs information representing the gripping failure to the return area calculation unit 117 in order to return the gripping target object into the area of the pallet 104. Upon receiving the information, the return area calculation unit 117 obtains an area in the pallet 104 to which the gripping target object is to be returned. In the embodiment, the distance distribution in the pallet is used as the area state.

A method of calculating a return area by using the distance distribution in the pallet 104 that has been measured by the area state measurement processing unit 113 will be explained. In the embodiment, the histogram of the distance distribution in the pallet 104 is obtained, and areas which have small variances and are almost flat are calculated as the return area. These areas are areas where a situation in which a returned gripping target object is caught by another target object and cannot be extracted in the next cycle is avoided because the heap is not complicated. Also, these areas are areas where a gripping target object does not fall down to an unexpected place when returned. Similar to FIG. 9A, the interior of the pallet 104 in the range image is divided into, for example, grids of 100×100 pixels. The variance is calculated from the histogram of the distance distribution detected in the grid. Grids in which the variance is smaller than a predetermined value (for example, within the σ range of ±1 cm) are defined as the return area to which the gripping target object should be returned.

In short, the return area calculation unit 117 specifies, as the return area, "an area on the surface on which the pallet 104 is placed" corresponding to an area where the variance of distances is smaller than a predetermined value, among areas in a range image obtained by the sensor unit 101.

In step S410, the return instruction unit 118 instructs the robot work instruction unit 121 to return a gripping target object 103'. The position to which the gripping target object 103' is returned is decided so that the gripping target object 103' falls within the area calculated in step S409. For example, the gripping target object 103' is returned to a position which is closest to the end effector of the robot 100 at the time of receiving the return instruction in the area specified in step S409. The method of deciding an orientation in which the gripping target object 103' is returned changes depending on whether the gripping state has been measured. If the gripping state has been measured, an orientation in which gripping or assembly will easily succeed is determined in advance, and the robot 100 is controlled to take this orientation and return the gripping target object 103'. If no gripping state has been measured, the gripping target object 103' may be directly returned to the heap in the pallet 104, or the robot 100 may be controlled to greatly change the orientation and return the gripping target object 103' in order to avoid the same failure.

As described above, according to the fourth embodiment, when gripping by the robot fails, the gripping target object is returned to an area where the variance of the histogram of the distance distribution is small. This enables efficient work because the gripping target object is not caught by another target object in the next cycle or does not fall down to an unexpected place when returned.

Fifth Embodiment

The fifth embodiment uses pallet frame position information as an area state in the pallet. The arrangement of a system according to the fifth embodiment is the same as that in the first embodiment except for the contents of processes to be performed by an area state measurement processing unit 113, return area calculation unit 117, and return instruction unit 118.

The operation of the system according to the fifth embodiment basically complies with the flowchart of FIG. 4 except that the contents of processes in steps S402, S409, and S410 are different from those in the first embodiment.

Only a difference from the first embodiment will therefore be explained below, and the remaining part is the same as that in the first embodiment, unless otherwise specified.

The area state measurement processing unit 113 measures an area state in a pallet 104 based on a sensed image output from a sensor information acquisition unit 111 and model information held by a model information holding unit 112. In the fifth embodiment, as the area state in the pallet 104, pallet frame position information is measured in addition to the position and orientation of a target object which can be gripped by a robot 100.

Similar to the first embodiment, the area state measurement processing unit 113 outputs the position and orientation information of a measured target object to a robot work instruction unit 121 to instruct the robot 100 to grip the target object. Also, the area state measurement processing unit 113 outputs, to the return area calculation unit 117, the pallet frame position information contained in the measured area state.

The return area calculation unit 117 receives, from a determination unit 116, information representing that the gripping by the robot 100 has failed, and further receives area state data output from the area state measurement processing unit 113 and gripping state data output from a gripping state measurement processing unit 115. Upon receiving these pieces of information, the return area calculation unit 117 calculates a return area to which the robot 100 should return the gripping target object. The return area calculation unit 117 outputs, to the return instruction unit 118, the area state data, the gripping state data, and data representing the calculated return area.

The return instruction unit 118 receives, from the return area calculation unit 117, the area state data, the gripping state data, and the data representing the return area. Upon receiving these pieces of information, the return instruction unit 118 obtains a position and orientation in which the robot 100 should return the gripping target object, and instructs the robot work instruction unit 121 to return the gripping target object into the pallet 104 by the robot 100.

In step S402, the area state measurement processing unit 113 measures, as an area state from an image acquired by the sensor information acquisition unit 111, the position and orientation of at least one gripping candidate object among a plurality of target objects. Further, the area state measurement processing unit 113 measures pallet frame position information from a sensed image of the target object irradiated with uniform-luminance light that is output from the sensor information acquisition unit 111. The pallet frame position can be obtained by template matching using the pallet shape as a template from a two-dimensional image of the target object irradiated with uniform-luminance light that is output from the sensor information acquisition unit 111, or by detecting four straight lines serving as upper sides of the pallet.

After the area state measurement processing unit 113 obtains the position and orientation of the gripping candidate object in step S402, it outputs the obtained position and orientation to the robot work instruction unit 121. The area state measurement processing unit 113 outputs the pallet frame position information to the return area calculation unit 117.

In step S409, the determination unit 116 outputs information representing the gripping failure to the return area calculation unit 117 in order to return the gripping target object into the area of the pallet 104. Upon receiving the information, the return area calculation unit 117 obtains an area in the pallet 104 to which the gripping target object is to be returned. In the embodiment, the pallet frame position information is used as the area state.

Figure 10:
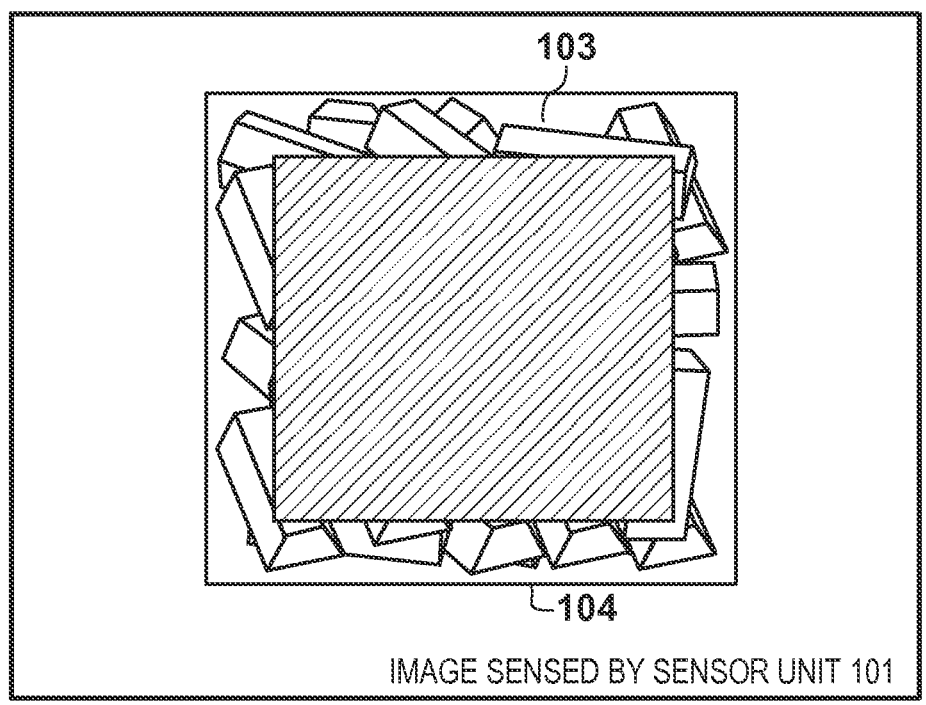
FIG. 10 is a view for explaining a return area.

A method of calculating a return area by using frame position information of the pallet 104 that has been measured by the area state measurement processing unit 113 will be explained. In the embodiment, if target objects are placed near the frame which is the end of the pallet 104, the robot 100 is highly likely to interfere with the pallet frame when gripping a gripping target object in a subsequent cycle. To prevent this, an area in the pallet 104 that is spaced apart from the frame of the pallet 104 is set as the return area. As shown in FIG. 10, an area spaced apart by, for example, 100 pixels from the frame position is defined as the return area.

In short, the return area calculation unit 117 specifies, as the return area, "an area on the surface on which the pallet 104 is placed" corresponding to an area inward by a predetermined distance from the frame of a container containing a set of target objects in an image sensed by a sensor unit 101.

In step S410, the return instruction unit 118 instructs the robot work instruction unit 121 to return a gripping target object 103'. The position to which the gripping target object 103' is returned is decided so that the gripping target object 103' falls within the area calculated in step S409. For example, the gripping target object 103' is returned to a position which is closest to the end effector of the robot 100 at the time of receiving the return instruction in the area specified in step S409. The method of deciding an orientation in which the gripping target object 103' is returned changes depending on whether the gripping state has been measured. If the gripping state has been measured, an orientation in which gripping or assembly will easily succeed is determined in advance, and the robot 100 is controlled to take this orientation and return the gripping target object 103'. If no gripping state has been measured, the gripping target object 103' may be directly returned to the heap in the pallet 104, or the robot 100 may be controlled to greatly change the orientation and return the gripping target object 103' in order to avoid the same failure.

As described above, according to the fifth embodiment, if gripping by the robot fails, the target object is returned to an area where the robot hardly interferes with the frame when gripping a target object. This enables efficient work because the robot does not interfere with the pallet frame when gripping a target object.

Sixth Embodiment

In the sixth embodiment, an area state in a pallet in which target objects are heaped is measured using a sensor (a projector and camera) which is mounted on a robot and acquires three-dimensional information (a range image or a two-dimensional image for obtaining three-dimensional point group data) about a target object. The assembly state of target objects by the robot is measured using a sensor (a projector and camera) which is arranged near an assembly target object and acquires three-dimensional information (a range image or a two-dimensional image for obtaining three-dimensional point group data) about a target object gripped by the robot and the assembly target object. If it is determined that the assembly by the robot has failed, an area in the pallet to which the target object is to be returned is calculated based on the measured area state in the pallet. Then, the robot is instructed to return the gripped target object to the return area. The robot returns the target object in accordance with the instruction. Only a difference from the first embodiment will be explained below, and the remaining part is the same as that in the first embodiment, unless otherwise specified.

Figure 11:
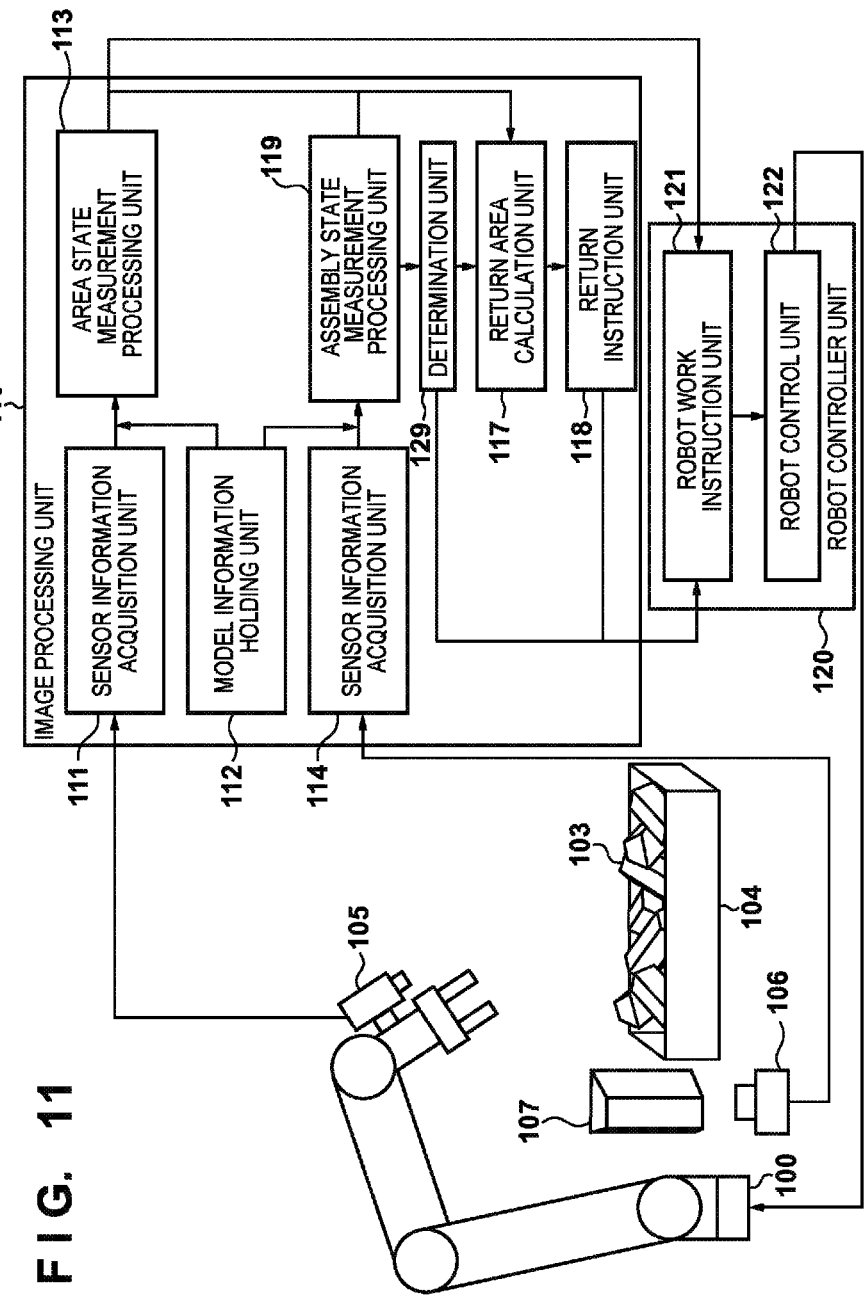
FIG. 11 is a view exemplifying the arrangement of a system.

First, the arrangement of a system according to the sixth embodiment will be exemplified with reference to FIG. 11. In FIG. 11, the same reference numerals as those in FIG. 1 denote the same functional units, and a description thereof will not be repeated. As shown in FIG. 11, in the sixth embodiment, a sensor unit 105 is mounted near the hand of a robot 100, similar to the above-described sensor unit 102, and a sensor unit 106 is arranged near an assembly target object 107. The assembly target object 107 is a cylindrical object and allows fitting and assembling a target object 103 into it.

An assembly state measurement processing unit 119 in an image processing unit 110 measures a state when the robot 100 assembles a target object into the assembly target object 107. A determination unit 129 determines whether the assembly state measured by the assembly state measurement processing unit 119 is successful. If the assembly state is successful, the determination unit 129 instructs a robot work instruction unit 121 about assembly work by the robot 100. If the assembly state is unsuccessful, the determination unit 129 outputs information representing the assembly failure to a return area calculation unit 117.

Figure 12:
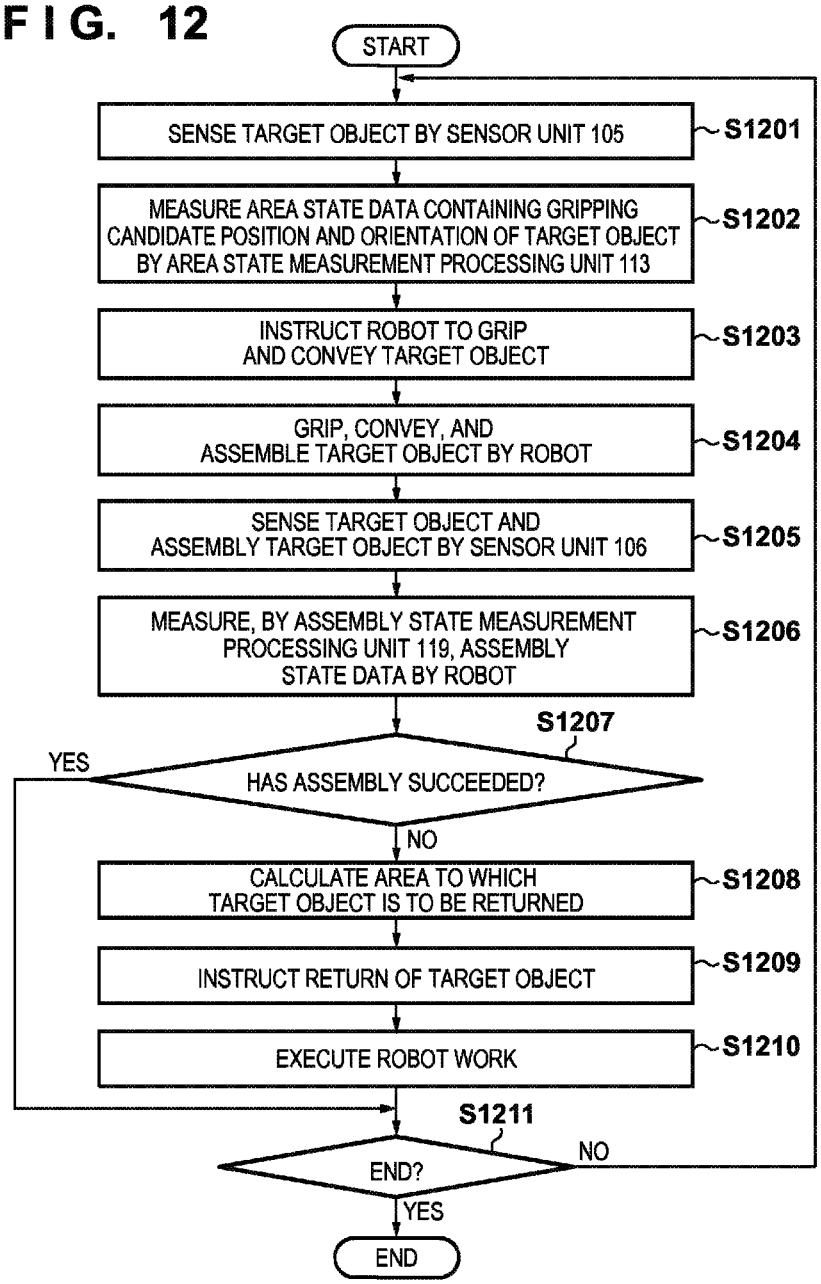
FIG. 12 is a flowchart showing the operation of the system.

Next, the operation of the system according to the sixth embodiment will be described with reference to the flowchart of FIG. 12.

In step S1201, the sensor unit 105 mounted near the hand senses an image of target objects 103, and outputs the sensed image to a sensor information acquisition unit 111. The sensor information acquisition unit 111 sends the sensed image to an area state measurement processing unit 113.

In step S1202, the area state measurement processing unit 113 measures an area state including the position and orientation of a gripping candidate object by using the sensed image received from the sensor information acquisition unit 111 and model information held by a model information holding unit 112. Processing of measuring the position and orientation of a gripping candidate object can adopt the second method described in step S402 in the first embodiment. The area state is the same as that described in the first to fifth embodiments.

In step S1203, the robot work instruction unit 121 generates an instruction signal to move the hand of the robot 100 to the position and orientation received from the area state measurement processing unit 113, grip the gripping target object, and assemble it into the assembly target object 107. The robot work instruction unit 121 then sends the generated instruction signal to a robot control unit 122.

In step S1204, the robot control unit 122 controls the robot 100 in accordance with the instruction signal from the robot work instruction unit 121 to grip the gripping target object and assemble it into the assembly target object 107.

In step S1205, the sensor unit 106 senses the gripping target object gripped by the hand and the assembly target object 107, and sends the sensed images to a sensor information acquisition unit 114.

In step S1206, the assembly state measurement processing unit 119 measures the state of assembly by the robot 100 by using the sensed image acquired from the sensor information acquisition unit 114 and the model information held by the model information holding unit 112. The assembly state is measured by obtaining the position and orientation of the gripping target object by the robot 100 and that of the assembly target object 107 by using the method described in step S406 of the first embodiment.

In step S1207, the determination unit 129 determines whether the assembly has succeeded. This determination is made by comparing a relative position and orientation between the position and orientation of the gripping target object and that of the assembly target object 107 which have been measured in step S1206, with a relative position and orientation taught between the target object and the assembly target object 107 that has been taught by teaching work or the like in advance.

For example, the determination unit 129 compares the relative positions and orientations, and if the relative position is equal to or smaller than 200 μm and the relative angle (each of the x, y, and z components) is equal to or smaller than 0.5°, determines that the assembly has succeeded. If these conditions are not satisfied or the assembly state measurement processing unit 119 fails in detection of the position and orientation of the target object or the assembly target object 107, the determination unit 129 determines that the assembly has failed. If the determination unit 129 determines that the assembly has succeeded, the process advances to step S1211. If the determination unit 129 determines that the assembly has failed, the process advances to step S1208.

Steps S1208, S1209, S1210, and S1211 are the same as steps S409, S410, S411, and S412 in the first embodiment, respectively, and a description thereof will not be repeated. Note that step S1210 complies with only an instruction in step S1209 (work to be executed when gripping has succeeded in the first embodiment is not performed in the sixth embodiment).

As described above, according to the sixth embodiment, the position and orientation of a gripping candidate object is measured using a sensor mounted on the robot, and the assembly state is measured using a sensor fixed near an assembly target object. If it is determined that the assembly by the robot has failed, the target object is returned to a good state based on the original state. This enables efficient work without decreasing the number of gripping target candidates.

Seventh Embodiment

In the first to sixth embodiments, the return area is an area surrounded by the boundary. This means that the return area is expressed by a binary value of the return area=1 and the non-return area=0 for the respective pixels of a sensed image. As a modification, the return area may be expressed by giving continuous values from 0 to 1 for the respective pixels of a sensed image. For example, a two-dimensional image feature or three-dimensional information may be measured with reliability, and the return area may be expressed using reliability. When a return instruction is issued, a target object gripped by the robot may be returned to a position poorest in reliability.

The sixth embodiment has described the technique of returning a target object based on an assembly state measured using the sensor unit 106. As a modification, the assembly state may be measured using the control parameters of a robot 100. If it is determined based on the control parameters of the robot 100 that the robot 100 performs an operation different from a predetermined assembly operation, it may be determined that the assembly has failed, and the target object may be returned.

There are various methods for returning a target object, and the user of the apparatus can decide a method to be selected from those described in the first to sixth embodiments in accordance with the size of a target object, shape complexity, material, and the like. The method of returning a gripping target object may be selected by the user by operating a user interface such as a keyboard or mouse, or by an image processing unit 110 depending on the situation.

Sensor units 101 and 102 may be formed from a single sensor unit. More specifically, the sensor unit 102 mounted on the robot also functions as the sensor unit 101. First, the sensor unit 102 is arranged above a pallet 104 by the robot 100 and measures an area state in the pallet. After the robot 100 grips a target object, the sensor unit 102 measures the gripping state of the gripped target object. If it is determined as a result of the measurement that the gripping has failed, an area to which the target object is to be returned is calculated based on the area state or gripping state measured using the sensor unit 102, and the return is instructed.

Also, sensor units 105 and 106 may be formed from a single sensor unit. More specifically, the sensor unit 105 mounted on the robot also functions as the sensor unit 106. First, the sensor unit 105 is arranged above the pallet 104 by the robot 100 and measures an area state in the pallet. After the robot 100 assembles a target object, the sensor unit 105 obtains an assembly state by measuring the position and orientation of the gripped target object and that of an assembly target object. If it is determined as a result of the measurement that the assembly has failed, an area to which the target object is to be returned is calculated based on the area state measured using the sensor unit 105, and the return is instructed.

Furthermore, the sensor units 101, 102, 105, and 106 may be sensor units (range image sensors or three-dimensional point group measurement sensors) for acquiring three-dimensional information (a range image or three-dimensional point group data) about a target object. The sensor unit for acquiring a range image can be, for example, a range image sensor formed from a projector and camera, or a TOF range image sensor for measuring the depth to each pixel based on the light propagation time. The three-dimensional information may be not image-like distance data aligned in a two-dimensional array, but three-dimensional point group data measured as a sparse point group.

The sensor unit may be formed from a one-dimensional line sensor, and scan a target object placed on and conveyed by a belt conveyor or the like to obtain information about the target object.

Position and orientation measurement using a model held by a model information holding unit 112 has been described above. However, the sensor units 101 and 102 (or the sensor units 105 and 106) may be formed from stereo cameras, and the position and orientation of a target object may be measured by stereo measurement.

Although the robot is used to change the position and orientation of the sensor unit 102 in the above description, the present invention is not limited to the use of the robot. For example, the sensor unit 102 may be mounted on a mechanism formed from a combination of a linear stage and rotation stage, and the position and orientation may be changed by controlling the stages. In addition to the robot for operating a target object, a configuration for changing a position and orientation may be adopted.

When a robot work instruction unit 121 receives the positions and orientations of a plurality of gripping candidate objects from an area state measurement processing unit 113, it selects the position and orientation of one gripping candidate object from them, but the area state measurement processing unit 113 may select it.

The image processing unit 110 shown in FIGS. 1 and 11 may be formed from a general PC (Personal Computer). For example, the model information holding unit 112 is formed from a hard disk device, and the hard disk device stores computer programs and data for causing the CPU of the PC to execute the functions of the respective units other than the model information holding unit 112 in the image processing unit 110. The CPU can load the computer programs and data stored in the hard disk device into a memory such as a RAM, as needed, and execute processing using the computer programs and data. As a result, the PC can implement the functions of the image processing unit 110.

Effects of Embodiments

In the first embodiment, the position and orientation of a gripping candidate object is measured using a fixed sensor, and the gripping state is measured using a sensor mounted on the robot. If it is determined that the gripping by the robot has failed, the target object is returned to its original state or a good state based on the gripping state. This enables efficient work without decreasing the number of gripping target objects.

In the second embodiment, when gripping by the robot fails, the target object is returned to an area where it is difficult to obtain the position and orientation of a target object unless the heaped state greatly changes. This enables efficient work because an area where the position and orientation of a target object can be easily obtained is not affected.

In the third embodiment, when gripping by the robot fails, the target object is returned to an area where the range measurement state is poor and it is difficult to obtain the position and orientation of a target object. This enables efficient work because an area where the position and orientation of a target object can be easily obtained is not affected.

In the fourth embodiment, when gripping by the robot fails, the target object is returned to an area where the variance of the histogram of the distance distribution is small. This enables efficient work because the target object is not caught by another target object in the next cycle or does not fall down to an unexpected place when returned.

In the fifth embodiment, if gripping by the robot fails, the target object is returned to an area where the robot hardly interferes with the frame when gripping a target object. This enables efficient work because the robot does not interfere with the pallet frame when gripping a target object.

In the sixth embodiment, the position and orientation of a gripping candidate object is measured using a sensor mounted on the robot, and the assembly state is measured using a sensor fixed near an assembly target object. If it is determined that the assembly by the robot has failed, the target object is returned to a good state based on the original state. This enables efficient work without decreasing the number of gripping target candidates.

Definitions

The area state is arbitrary as long as it represents a state in an area where target objects exist. As examples of the area state, the first to fifth embodiments have described the position and orientation of a gripping candidate object, a two-dimensional image feature such as a feature point or edge, three-dimensional information such as a range measurement state, the distance distribution in the pallet, and pallet frame position information, respectively.

The sensor unit 101 is arbitrary as long as it is configured to measure an area state in the pallet. For example, the sensor unit 101 may be a fixed sensor in the first embodiment or a sensor mounted on the robot in the sixth embodiment.

The sensor unit 102 is arbitrary as long as it is configured to measure the state of gripping or assembly by the robot. For example, the sensor unit 102 may be a sensor mounted on the robot in the first embodiment or a fixed sensor in the sixth embodiment. As described in the seventh embodiment, the assembly state may be measured using the control parameters of the robot.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-053685 filed Mar. 9, 2012 which is hereby incorporated by reference herein in its entirety.

What is claimed is:

1. An information processing apparatus comprising:
   an area state determination unit which determines, based on a result of measurement by a first sensor, a state of an area where a plurality of target objects are arranged;
   a control unit which controls a robot to hold one target object among the plurality of target objects by a holding unit of the robot;
   a holding state determination unit which determines a holding state of a holding target object held by the holding unit from a result of measuring the holding target object by using a second sensor; and
   an area decision unit which, when holding is determined based on the holding state determined by said holding state determination unit to have failed, decides, by using at least one of the result of measurement by the first sensor and the result of measurement by the second sensor, a return area where the holding target object is to be returned,
   wherein said control unit controls the robot to return the holding target object in the return area.

2. The apparatus according to claim 1, wherein said area state determination unit acquires a sensed image of the plurality of target objects from the first sensor, and determines a state of an area including at least position and orientation information of the plurality of target objects by using the sensed image, and said holding state determination unit acquires a sensed image of the holding target object from the second sensor, and determines a position and orientation of the holding target object by using the sensed image of the holding target object.

3. The apparatus according to claim 2, wherein said area decision unit decides, as the return area, an area on a surface on which a set of the plurality of target objects which is specified based on the position and orientation obtained by said area state determination unit is placed, that corresponds to an area excluding an area of the plurality of target objects in the sensed image of the set.

4. The apparatus according to claim 1, wherein
said area state determination unit determines a state of an area including a two-dimensional image feature of the area where the plurality of target objects are placed, and
said area decision unit decides, as the return area, an area on a surface on which a set of the plurality of target objects is placed, that corresponds to an area having two-dimensional image features in an amount falling outside a predetermined range in the sensed image of the set.

5. The apparatus according to claim 1, wherein
said area state determination unit determines a distance measurement state of the area where the plurality of target objects are placed, and
said area decision unit decides, as the return area, an area on a surface on which a set of the plurality of target objects is placed, that corresponds to an area where the distance measurement state is poor in the area where the plurality of target objects are placed.

6. The apparatus according to claim 1, wherein
said area state determination unit determines a distribution of distances of the area where the plurality of target objects are placed, and
said area decision unit decides, as the return area, an area on a surface on which a set of the plurality of target objects is placed, that corresponds to an area where a variance of distances is smaller than a predetermined value in the area where the plurality of target objects are placed.

7. The apparatus according to claim 1, wherein
said area state determination unit determines a range of the area where the plurality of target objects are placed, and
said area decision unit decides, as the return area, an area on a surface on which a set of the plurality of target objects is placed, that corresponds to an area excluding a range within a predetermined distance from a boundary in the area where the plurality of target objects are placed.

8. The apparatus according to claim 1, wherein said control unit controls the robot to return the holding target object in a predetermined orientation by the holding unit.

9. The apparatus according to claim 1, wherein said control unit controls the robot to return the holding target object by the holding unit in an orientation different from an orientation before holding the holding target object.

10. The apparatus according to claim 1, wherein said control unit controls the robot to return the holding target object by the holding unit in an orientation different from orientations of target objects presenting around the holding target object before holding the holding target object.

11. A non-transitory computer-readable storage medium storing a computer program for causing a computer to function as each unit of an information processing apparatus defined in claim 1.

12. The apparatus according to claim 1, wherein the return area is a part of a whole area in a container where the plurality of target objects are contained.

13. An information processing apparatus comprising:
an area state determination unit which determines, based on a result of measurement by a first sensor, a state of an area where a plurality of target objects are arranged;
a control unit which controls a robot to hold one target object among the plurality of target objects by a holding unit of the robot;
an assembly state determination unit which determines an assembly state of a holding target object held by the holding unit from a result of measuring the holding target object by using a second sensor; and
an area decision unit which, when assembly is determined based on the assembly state determined by said assembly state determination unit to have failed, decides, by using the result of measurement by the first sensor, a return area where the holding target object is to be returned,
wherein said control unit controls the robot to return the holding target object in the return area.

14. A non-transitory computer-readable storage medium storing a computer program for causing a computer to function as each unit of an information processing apparatus defined in claim 13.

15. The apparatus according to claim 13, wherein
said area state determination unit acquires a sensed image of the plurality of target objects from the first sensor, and determines a state of an area including at least position and orientation information of the plurality of target objects by using the sensed image, and
said assembly state determination unit acquires a sensed image of the holding target object from the second sensor, and determines a position and orientation of the holding target object by using the sensed image of the holding target object.

16. The apparatus according to claim 15, wherein said area decision unit decides, as the return area, an area on a surface on which a set of the plurality of target objects which is specified based on the position and orientation obtained by said area state determination unit is placed, that corresponds to an area excluding an area of the plurality of target objects in the sensed image of the set.

17. The apparatus according to claim 13, wherein
said area state determination unit determines a state of an area including a two-dimensional image feature of the area where the plurality of target objects are placed, and
said area decision unit decides, as the return area, an area on a surface on which a set of the plurality of target objects is placed, that corresponds to an area having two-dimensional image features in an amount falling outside a predetermined range in the sensed image of the set.

18. The apparatus according to claim 13, wherein
said area state determination unit determines a distance measurement state of the area where the plurality of target objects are placed, and
said area decision unit decides, as the return area, an area on a surface on which a set of the plurality of target objects is placed, that corresponds to an area where the distance measurement state is poor in the area where the plurality of target objects are placed.

19. The apparatus according to claim 13, wherein
said area state determination unit determines a distribution of distances of the area where the plurality of target objects are placed, and
said area decision unit decides, as the return area, an area on a surface on which a set of the plurality of target objects is placed, that corresponds to an area where a variance of distances is smaller than a predetermined value in the area where the plurality of target objects are placed.

20. The apparatus according to claim 13, wherein
said area state determination unit determines a range of the area where the plurality of target objects are placed, and
said area decision unit decides, as the return area, an area on a surface on which a set of the plurality of target objects is placed, that corresponds to an area excluding a range within a predetermined distance from a boundary in the area where the plurality of target objects are placed.

21. The apparatus according to claim 13, wherein said control unit controls the robot to return the holding target object in a predetermined orientation by the holding unit.

22. The apparatus according to claim 13, wherein said control unit controls the robot to return the holding target object by the holding unit in an orientation different from an orientation before holding the holding target object.

23. The apparatus according to claim 13, wherein said control unit controls the robot to return the holding target object by the holding unit in an orientation different from orientations of target objects presenting around the holding target object before holding the holding target object.

24. The apparatus according to claim 13, wherein the return area is a part of a whole area in a container where the plurality of target objects are contained.

25. An information processing apparatus comprising:
a robot including a holding unit;
a first sensor;
a second sensor;
an area state determination unit which determines, based on a result of measurement by a first sensor, a state of an area where a plurality of target objects are arranged;
a control unit which controls said robot to hold one target object among the plurality of target objects by the holding unit;
a holding state determination unit which determines a holding state of a holding target object held by the holding unit from a result of measuring the holding target object by using a second sensor; and
an area decision unit which, when holding is determined based on the holding state determined by said holding state determination unit to have failed, decides, by using at least one of the result of measurement by the first sensor and the result of measurement by the second sensor, a return area where the holding target object is to be returned,
wherein said control unit controls said robot to return the holding target object in the return area.

26. An information processing apparatus comprising:
a robot including a holding unit;
a first sensor;
a second sensor;
an area state determination unit which determines, by using a first sensor, a state of an area where plurality of target objects that can be held by the holding unit exists;
a control unit which controls said robot to hold one target object among the plurality of target objects by the holding unit;
an assembly state determination unit which determines an assembly state of a holding target object held by the holding unit from a result of measuring the holding target object by using a second sensor; and
an area decision unit which, when assembly is determined based on the assembly state determined by said assembly state determination unit to have failed, decides, by using the result of measurement by the first sensor, a return area where the holding target object is to be returned,
wherein said control unit controls said robot to return the holding target object in the return area.

27. An information processing method comprising:
an area state determination step of determining, based on a result of measurement by a first sensor, a state of an area where plurality of target objects are arranged;
a control step of controlling a robot to hold one target object among the plurality of target objects by a holding unit of the robot;
a holding state determination step of determining a holding state of a holding target object held by the holding unit from a result of measuring the holding target object by using a second sensor; and
an area decision step of, when holding is determined based on the holding state determined in the holding state determination step to have failed, deciding, by using at least one of the result of measurement by the first sensor and the result of measurement by the second sensor, a return area where the holding target object is to be returned,
wherein in the control step, the robot is controlled to return the holding target object in the return area.

28. An information processing method comprising:
an area state determination step of determining, based on a result of measurement by a first sensor, a state of an area where plurality of target objects are arranged;
a control step of controlling a robot to hold one target object among the plurality of target objects by a holding unit of the robot;
an assembly state determination step of determining an assembly state of a holding target object held by the holding unit from a result of measuring the holding target object by using a second sensor; and
an area decision step of, when assembly is determined based on the assembly state determined in the assembly state determination step to have failed, deciding, by using the result of measurement by the first sensor, a return area where the holding target object is to be returned,
wherein in the control step, the robot is controlled to return the holding target object in the return area.

29. An information processing apparatus comprising:
a control unit which controls a robot to hold one target object among a plurality of target objects by a holding unit of the robot;
a holding state determination unit which determines a holding state of a holding target object held by the holding unit from a result of measuring the holding target object by using a sensor; and
an area decision unit which, when holding is determined based on the holding state determined by said holding state determination unit to have failed, decides a return area where the holding target object is to be returned,
wherein said control unit controls the robot to return the holding target object in the return area.

30. A non-transitory computer-readable storage medium storing a computer program for causing a computer to function as each unit of an information processing apparatus defined in claim 29.

31. The apparatus according to claim 29, wherein the return area is a part of a whole area in a container where the plurality of target objects are contained.

32. An information processing method comprising:
a control step of controlling a robot to hold one target object among a plurality of target objects by a holding unit of the robot;
a holding state determination step of determining a holding state of a holding target object held by the holding unit from a result of measuring the holding target object by using a sensor; and
an area decision step of, when holding is determined based on the holding state determined by said holding state determination step to have failed, deciding a return area where the holding target object is to be returned,
wherein said control step controls the robot to return the holding target object in the return area.

33. An information processing apparatus comprising:
a control unit which controls a robot to hold one target object among a plurality of target objects by a holding unit of the robot;
a holding state determination unit which determines whether a holding state of a holding target object held by the holding unit is a specific state based on a result of measuring the holding target object by using a sensor; and
an area decision unit which, when said holding state determination unit determines that the holding state of the holding target object is the specific state, decides a return area where the holding target object is to be returned,
wherein said control unit controls the robot to return the holding target object in the return area.

34. A non-transitory computer-readable storage medium storing a computer program for causing a computer to function as each unit of an information processing apparatus defined in claim 33.

35. The apparatus according to claim 33, wherein the return area is a part of a whole area in a container where the plurality of target objects are contained.

36. An information processing method comprising:
a control step of controlling a robot to hold one target object among a plurality of target objects by a holding unit of the robot;
a holding state determination step of determining whether a holding state of a holding target object held by the holding unit is a specific state based on a result of measuring the holding target object by using a sensor; and
an area decision step of, when said holding state determination step determines that the holding state of the holding target object is the specific state, deciding a return area where the holding target object is to be returned,
wherein said control step controls the robot to return the holding target object in the return area.

* * * * *